United States Patent [19]

Roberts

[11] Patent Number: 4,621,571
[45] Date of Patent: Nov. 11, 1986

[54] SATELLITE COFFEE BREWING SYSTEM

[75] Inventor: Melvin F. Roberts, Niles, Ill.

[73] Assignee: Bloomfield Industries, Inc., Chicago, Ill.

[21] Appl. No.: 675,531

[22] Filed: Nov. 28, 1984

[51] Int. Cl.$^4$ .................. A47J 31/24; A47J 31/06
[52] U.S. Cl. ........................ 99/280; 99/281; 99/282; 99/285; 99/290; 99/295; 99/305
[58] Field of Search ............... 99/295, 283, 307, 290, 99/279, 280, 281, 282, 283, 284, 288, 291, 293, 294, 298, 300, 304, 305, 307, 285; 426/433

[56] References Cited

U.S. PATENT DOCUMENTS

| D. 269,011 | 5/1983 | Stetler et al. | |
| 2,485,246 | 10/1949 | Swanson | 99/283 |
| 2,890,643 | 6/1959 | King | 99/307 |
| 3,425,338 | 2/1969 | Vittoe | 99/295 |
| 4,207,809 | 6/1980 | Brill | 99/295 |
| 4,309,939 | 1/1982 | Stover | 99/295 |

OTHER PUBLICATIONS

Gemini Coffee Brewing System, Wilbur Curtis Company, Inc., 6/8/81.

*Primary Examiner*—Robert W. Jenkins
*Attorney, Agent, or Firm*—Lee, Smith & Zickert

[57] ABSTRACT

A satellite coffee brewing system (10) includes a central brewing unit (11) cooperative with a plurality of like satellite receptacle units (12) for the storage and dispensing of hot coffee while positioned with the central brewing unit or at remote stations in a restaurant. The central brewing unit (11) comprises a siphon-type hot water system that directs the hot brewing water to an adjustable brew chamber (14) which is capable of discharging coffee in at least two different orientations whereby to alternately fill satellite units (12) arranged at any of said filling orientation. The central brewing unit includes a by-pass valve (44) capable of directing a portion of the hot water to by-pass the coffee grounds held inside a filter (50) in the brew chamber (14) by a basket (49) and spacers (47) so that the by-pass water flows around the filter (50) and into the satellite receptacle whereby the coffee grounds are prevented from being overextracted. A safety relay (60) is provided whereby the central brewing unit (11) includes a high capacity, quick recovery heating element (19) interiorly of the hot water tank to achieve the rapid successive brewing of large batches of coffee. A safety switch assembly (37) is provided whereby a brewing cycle cannot be initiated unless the brew chamber (14) is properly aligned to discharge into a correspondingly aligned empty satellite unit (12). A timer (62) and signal light (63) are electrically actuated by a brewing switch (43) wherein the age of a brewed batch of coffee may be monitored.

59 Claims, 19 Drawing Figures

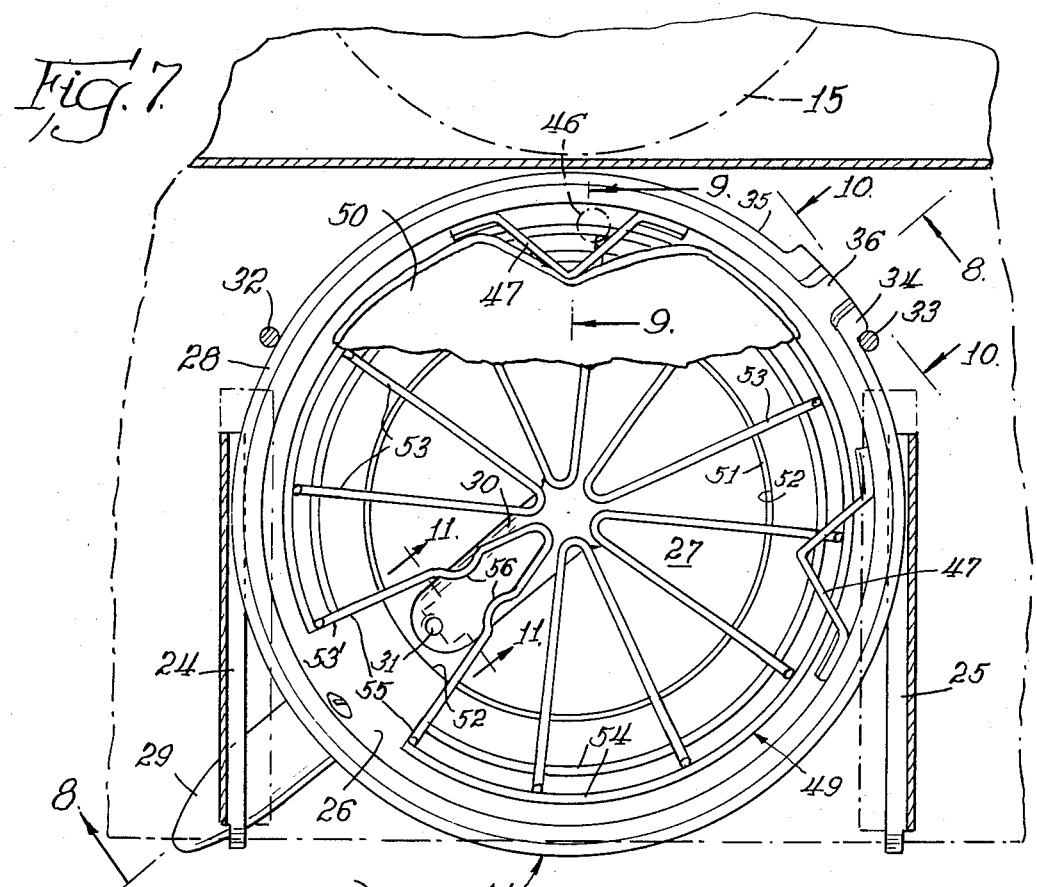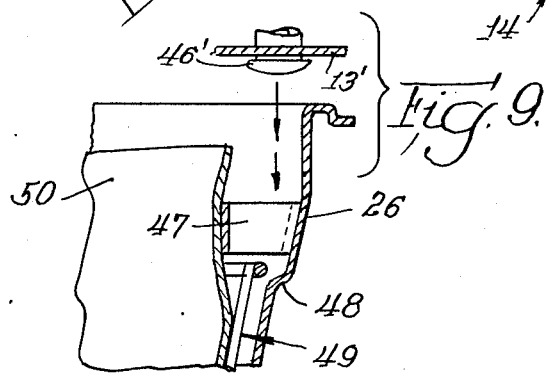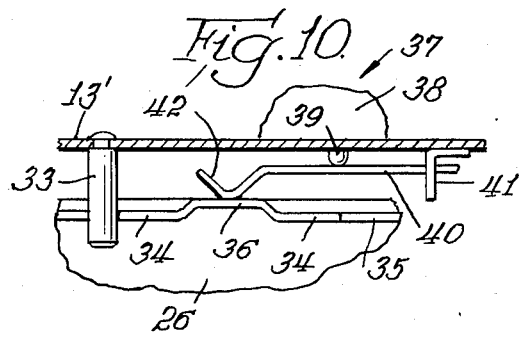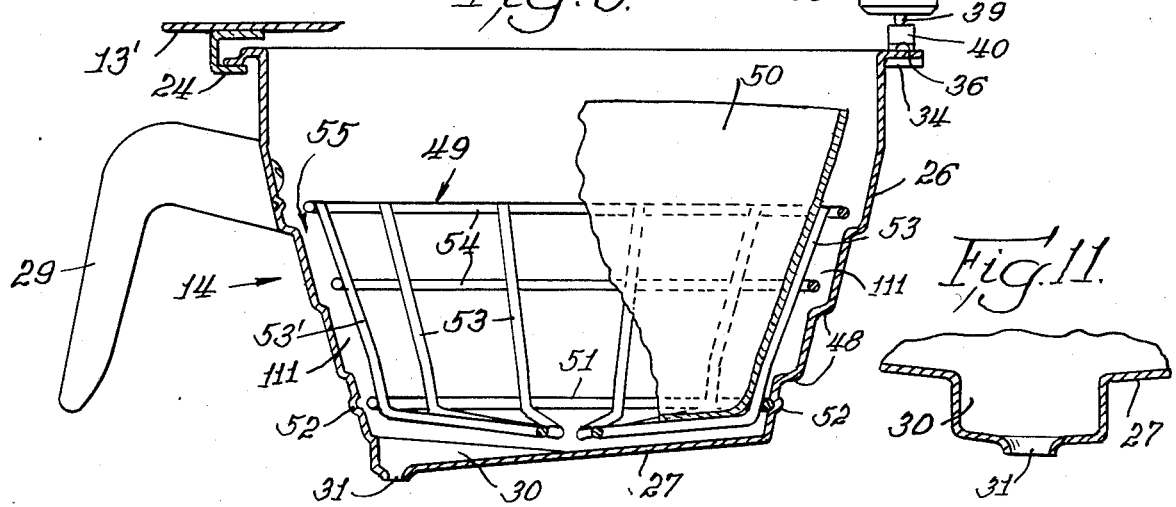

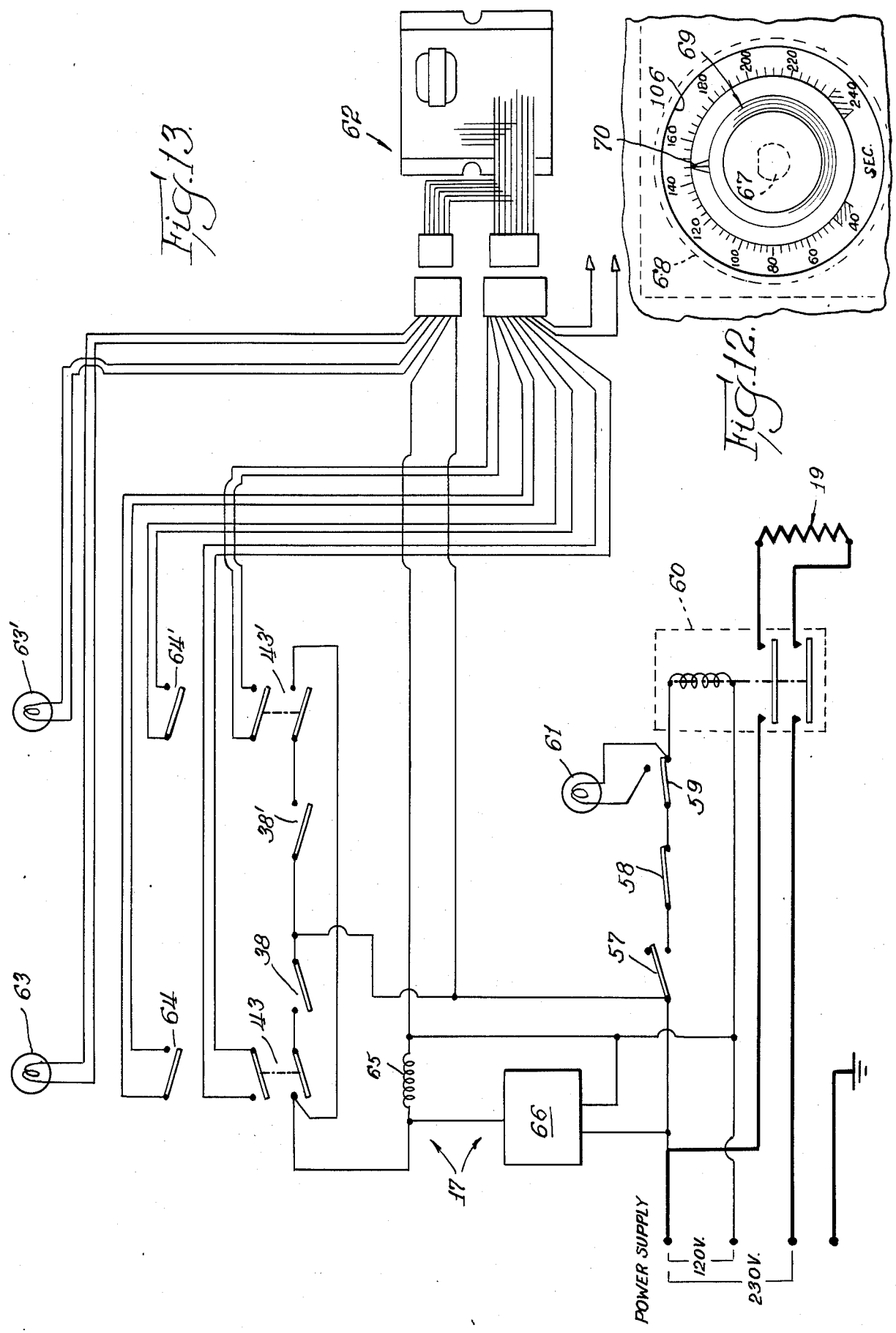

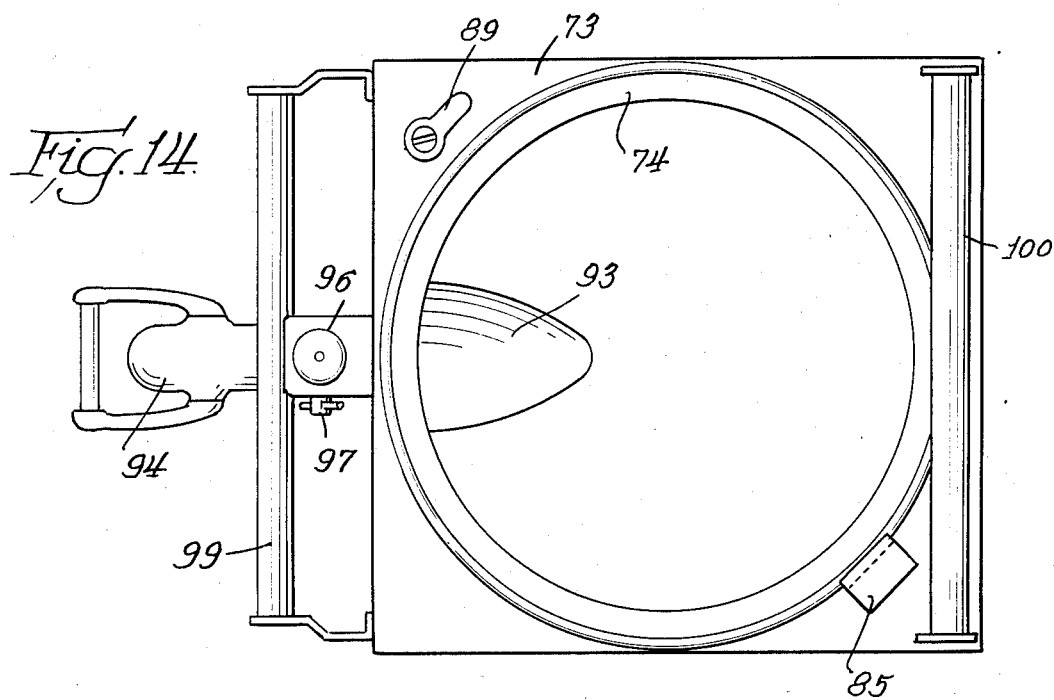
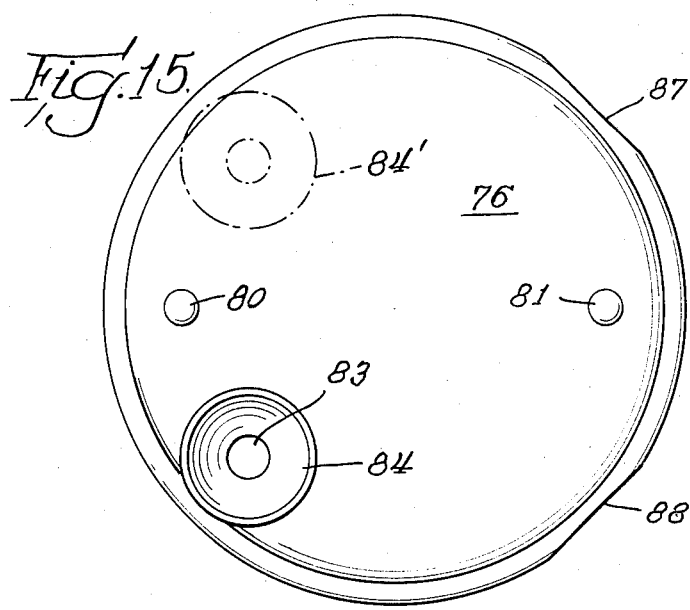
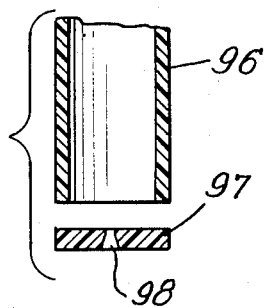
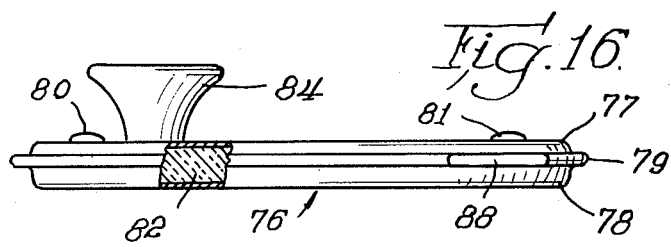
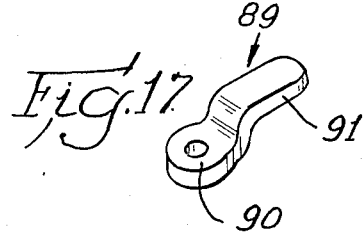
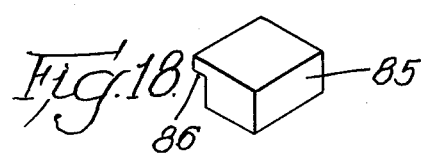

SATELLITE COFFEE BREWING SYSTEM

BACKGROUND AND SUMMARY OF THE INVENTION

The invention relates to commercial coffee brewing systems and is particularly directed to improving upon systems that include a central brewing unit which siphons hot water from a hot water tank to a coffee brewing chamber and then discharges brewed coffee into a transportable satellite receptacle unit arranged therebelow and adapted for receiving, storing and dispensing the hot coffee. The invention specifically fills the needs of the so-called fast food industry by providing a high volume coffee brewing system for making quick, successive batches of high quality coffee and which utilizes interchangeable and portable satellite receptacle units that permit serving the coffee either at the central brewing unit or at remote service stations in a restaurant.

In the food service industry, the prompt availability of good quality coffee is a major concern. Since customers may request this beverage in sporadic intervals and varying amounts during the course of a day, it has become necessary to have fresh, large volumes of coffee available on a continuing basis. Thus, a high volume brewing system has been sought which can brew and make available a substantial amount of coffee in a short time with little supervision required by the restaurant employees. A major problem with present commercial systems is that the recovery time required to re-heat hot water for a next brew is too slow to effectively meet the demand at peak business hours. High wattage heating elements have been tried, but the increased wattage presents a problem due to the overheating of conventional switching and thermostat components in the electrical system. Another problem discovered is the inherent inability of brewed coffee to retain its fresh taste for longer than about thirty minutes while being heated inside a dispensing receptacle to maintain the required hot serving temperature. Past this point, brewed coffee degrades and is rendered unpalatable. The maintenance of high quality standards is a great concern to the operators of restaurants who have developed significant repute and goodwill due to their diligence in serving fine quality food and drink. It would accordingly be desirable to avoid this heat degradation by eliminating the need for heating the coffee after it has been brewed. It would be a further advantage to provide a quality control system that monitors the age of a batch of coffee whereby the operator can easily determine when the coffee has reached a less-than-desired serving temperature and thereby discard an old batch of coffee rather than inadvertently serving it.

The demand for a constant supply of fresh coffee has not been met by the use of urn-type brewers. While large volumes of coffee can be brewed in such systems, the coffee is required to be stored in the urn and maintained at the proper temperature. Unless all the coffee is served, the remainder should be discarded upon reaching the point of degradation. Thus, not only does the restaurant operator lose the potential sales for this coffee, but a long time delay is experienced while the next batch of coffee is brewed in the urn. A siphon-type brewing system which allows the restaurant operator the option of having several receptacles of hot fresh coffee available and the means for quickly brewing additional batches to replenish empty containers would greatly enhance restaurant efficiency and avoid the wastefulness connected with urn-type devices.

Additionally, a siphon-type system which provides satellite style receptacles that do not require continuous heating and may be stationed remote from the central brewer while another satellite is being filled would further advance commercial brewing techniques.

In ascertaining the goals of the food service industry, it has been learned that it is preferable to utilize a single spray head and brew chamber arrangement, wherein the single brew chamber is adjustable for the alternate filling of satellite units positioned in at least two orientations adjacent the central brewer. Only one siphon tube and spray head arrangement would be needed to convey hot water from the tank. This capability would eliminate the need for multiple brew chambers, streamline coffee making effort in a restaurant and also result in the minimization of components and size of the brewing device.

A safety switch arrangement that prevents the brewing of coffee unless the adjustable brew chamber is properly positioned would be a great advantage to assure that a brew cycle is not initiated until the brew chamber is correctly oriented for discharge into a satellite receptacle aligned for filling therebelow.

In brewing large volumes of coffee, such as one to two gallons (7.57 liters) per cycle, it has been discovered that the coffee grounds can be overextracted and the resultant coffee is bitter. Accordingly, the need has arisen for the by-passing of a percentage of the hot water around the coffee grounds and directly into the receiving receptacle. In this manner, all of the hot water does not immerse the coffee grounds and overextraction is prevented. When softened water is used, much less is required to be directed though the grounds for proper extraction than with the use of untreated, or hard, water. As water conditions, as well as the coffee blends, vary it will be understood that the amount of water needed to correctly brew the coffee will also vary, and therefore the capability of adjusting the percentage of by-pass water would be very useful. A related obstacle to achieving a by-pass system for large volume brewing involves the filter paper which retains the coffee grounds in the brew chamber. The filter must be positioned so that the by-pass flow is not restricted by the paper to be inadvertently passed through the grounds. The by-pass water must be effectively directed around the filter paper and grounds so that it quickly flows downward to the discharge orifice and into the receptacle. It will be appreciated that an adjustable by-pass system that achieves these goals, in combination with a single spray head and adjustable brew chamber assembly, would significantly advance coffee brewing techniques.

In the past, warming plates have been required to maintain the temperature of the brewed coffee held in a receptacle. The elimination of warming plate devices and the attendant electrical costs for energizing their heating elements, would offer both a monetary saving and reduction in the size of the system. A satellite receptacle unit that functions as a thermos-type bottle to maintain brewed coffee "fresh" and at a desired serving temperature of from about 170° F. (76.7° C.) to about 180° F. (82.2° C.) for a one hour holding period and which thereby eliminates heat degradation, additional electric costs and warming plate structures, would be valuable advances in the art.

It is also an object of the invention to ensure that the coffee is dispensed from the satellite receptacle at the desired serving temperature. This has been a particular concern when a conventional sight glass, or sight gauge, is combined with the satellite receptacle for the purpose of observing the volume of coffee remaining therein. It is, of course, important that the volume of coffee be monitored in this way so that the restaurant operator can determine when it is time to re-fill a unit. The sight glass is required to fluidly communicate with the interior of the receptacle upstream of the dispensing spigot whereby the coffee flows into the sight tube and reaches the corresponding fluid level found in the receptacle. Because the sight glass is located outside of the container, it is surrounded by the cooler ambient air conditions. A sufficient amount of coffee may be held in the sight glass to fill a cup of coffee. When the dispensing spigot is opened, the coffee in the tube will seek to flow downwardly through the spigot and into the coffee cup. As a result, cooler coffee, much below the desired drinking temperature, could be found in the cup of coffee served to the customer. It would be advantageous to greatly restrict the amount of coffee that flows outwardly from the sight gauge when the dispensing spigot is open, but still allow for the fluid communication with the coffee inside the receptacle to permit monitoring the level therein.

While the primary objective is to achieve an improved large volume brewing system, it will also be appreciated that the satellite coffee brewing system should include the ability to brew smaller amounts of coffee. A related object would also be the ability to precisely adjust the volume of cold water admitted to the hot water tank in response to changing water line pressures so that a uniform volume of brewed coffee per cycle is maintained. In known siphon-type brewing arrangements, a timed inlet valve controls the amount of cold inlet water admitted at the bottom of the hot water container which in turn displaces an equal amount of hot water to be siphoned from the top portion of the container for brewing. Should the required amount of coffee to be brewed, or the inlet pressure change, it would be very helpful to precisely adjust the open-time of the inlet valve whereby the exact desired amount of hot brewing water is siphoned from the tank. In the past, manual adjustment of the timer for the inlet valve was made possible but the adjustment was imprecise and often resulted in admitting too much water or too little water. Thus, inefficient trial and error experimentation at different settings was needed.

With particular regard to the efficient service procedures required in fast food-type restaurants, it will be understood that space-saving devices are demanded. Typically these establishments serve a wide variety of food and beverages, and the convenient accessibility of the various cooking and dispensing devices is critical to providing the prompt service expected by the customer. A satellite coffee brewing system must therefore not only meet the goal of brewing good tasting coffee, but should also be designed so that the system does not contravene the spacing requirements for other serving and cooking devices. It has been learned that the width of coffee making units is the single most critical design feature due to the typical side-by-side arrangement of coffee brewing units with other devices typically found in a restaurant. The more cooking and dispensing devices that can be usefully positioned in close proximity near the customer service counter, the greater the efficiency of the restaurant operation. A satellite coffee brewing system that provides a brewing unit capable of being arranged with at least two satellite units thereat to achieve an overall width of less than sixteen inches (40.6 cm) would meet the most rigid standards of the industry.

For sanitary reasons, the design of such a brewing system must also allow restaurant personnel to clean beneath the brewing units. Standard health codes and regulations dictate that coffee making devices provide for a four-inch (10.2 cm.) vertical spacing above the work counter in order to permit regular effective cleaning to be made. These practical concerns for size and spacing must be considered in conjunction with the operational requirements for quantity and quality brewing.

In summary, the invention may be described as a compact high-efficiency satellite coffee brewing system which comprises a central coffee brewing unit cooperative with a plurality of interchangeable, thermos-type satellite containers and offers the capability or large volume, almost continuous, brewing and the ability to keep brewed batches fresh and hot for serving from the satellite units either while they are stationed at the central brewing unit or when moved to remote sites in a restaurant. The brewing unit is capable of sequentially filling at least two satellite units arranged therewith. The central brewing unit includes a housing having a hot water tank heated by an electrically energized, and thermostatically controlled, heating element wherein the hot brewing water in the tank is displaced and siphoned to a brew chamber upon opening a water inlet valve assembly when a brewing cycle is initiated. The housing further includes mounting means for removably holding an adjustable brew chamber beneath a single spray head assembly which directs hot brewing water from the siphon into the brew chamber. The system provides significant improvements in the art including a high capacity heater for the "quick recovery" of the necessary brewing water temperature following a brewing cycle. The system is adapted to accomodate a heating element of substantially greater capacity than the 3600 to 4800 watt range used in conventional systems. A relay arrangement is provided to operate the heater with a 220–240 volt circuit while the running and safety thermostats that control the heater may be operated at the standard conventional 110–120 volt power to prevent over-heating. Further, the central brewing unit includes an adjustable metering valve arranged along the siphon for by-passing clear hot water whereby the coffee grounds are prevented from being overextracted. The brew chamber wall is stepped and is cooperative with a filter paper holding means adapted to engage the brew chamber and ensure that the by-pass water flows around the filter paper rather than being directed through the grounds. The brew chamber further includes a filter spacing means which creases a top portion of the filter paper inwardly from the side of the brew chamber for the receipt of the by-pass water discharged from the adjustable metering valve.

In furtherance of the goals set forth, the adjustable brewing chamber is cooperative with the single siphon, spray-head and metering by-pass valve in any of at least two alternate discharging positions. The satellite receptacles are capable of being interchangeably arranged at any said discharge orientation to facilitate alternate filling thereof.

In alliance with the adjustable brew-chamber, a brew switch and safety switch arrangement is provided to ensure that the brew chamber is in the proper discharge position before a brew cycle can occur.

The unique safety brewing feature comprises, in preferred form, a microswitch positioned at each discharge position wherein a brew switch is wired in series with the microswitch for each location so that a brew cycle cannot be initiated unless the corresponding microswitch is closed. The adjustable brew chamber has switch actuator means arranged thereon to contact and close the microswitch at each discharge position. Alignment means are provided on the brewing unit whereby the brew chamber is positioned thereat to properly locate the switch actuator means for contact with a microswitch and to correctly dispose the discharge orifice of the brew chamber above an inlet to a satellite unit. Thus, until the adjustable brew chamber is positioned in the proper orientation, the corresponding brew switch for that discharge position is not operable and a brewing cycle cannot be initiated. This prevents the inadvertent discharge of hot coffee from the brew chamber.

The invention also provides a timing circuit means and signal light means for monitoring a batch of brewed coffee so that the restaurant operator is alerted at the time when the coffee has reached the point of about 40-60 minutes after brewing.

The brewing system also includes an extender means for a hot water faucet assembly which disposes a discharge end thereat at a convenient height to allow restaurant employees to easily monitor the hot water dispensed into a cup for making tea, or the like. The extender means is flexible to allow for accidental bumping contact and also insulates an inner extender tube wherby the employee's hands are prevented from coming into contact with the hot inner extender tube.

A great advance in the art is obtained because the satellite units are interchangeable for alternate positioning at the central brewing unit. The satellite units have an insulated housing in which a large, preferably seven quart (6.62 liters), coffee reservoir is arranged and which keeps the coffee hot for at least one hour without requiring external heating.

The satellite receptacle units are also provided with a dispensing spigot means fluidly associated with a durable sight gauge. The gauges fluidly communicate with the coffee inside the receptacle through a unique restrictor means whereby the outward flow from the tube is minimized so that the relatively cooler coffee held in the gauge does not discharge when the dispensing spigot is opened. Thus, hot coffee is assured to be drawn from the reservoir of the satellite receptacle.

The satellite units also include removable and insulated covers having funnel-type inlet means which may be closely arranged below the discharge orifice of the brew chamber so that hot coffee is immediately directed interiorly of the receptacle and into the insulated reservoir. Each cover is adjustable into a plurality of receiving positions whereby each satellite unit may be placed at every brew chamber discharging position. Positioning and locking means for the cover facilitate the exact secure positioning of the cover in each desired inlet arrangement. Accordingly, the interchangeability of the satellite units makes possible the transport of a filled satellite from the central brewing unit to a remote service station in the restaurant while an empty satellite unit maybe exchanged at the same position for the next brewing cycle.

In the event that a change in the amount of hot brewing water siphoned to the brew chamber is required, means for precisely adjusting the timed inlet valve is associated with the valve timer. The adjustment means comprises a calibrated dial and indicator knob arranged with an adjustment stem of the timer whereby the restaurant operator may precisely adjust the open time of the inlet valve and thereby precisely vary the amount of hot water siphoned into the brew chamber.

The satellite coffee brewing system further achieves an efficient compact space-saving design wherein a plurality of satellite receptacles may be arranged at the brewing unit for the receipt of hot coffee. In preferred form, two satellite units are arrangeable at the brewing unit and provide a relatively narrow width of less than sixteen inches (40.6 cm.) whereby a critical space saving is obtained. No connection between the satellite units and brewing unit is required and the satellites are freestanding and fully portable.

For the achievement of sanitation and cleaning goals, the central brewing unit is mountable on leg means whereby it is spaced from the work counter at the usually prescribed elevation of about four inches (10.2 cm.). The unique design of the system allows for the central brewing unit to be constructed whereby this goal can be met and yet the brewing unit is arranged at a convenient height for the restaurant employees. Because the satellite units are transportable, they do not have to meet the sanitary spacing requirement but may be constructed to also have leg means to space the bottom of the units above cooler resting surfaces. The satellite units are also cooperative with removable drain plates capable of being positioned under the dispensing spigot in order to catch and hold any spilled coffee that might result when a cup is being filled.

BRIEF DESCRIPTION OF THE DRAWINGS

The satellite coffee brewing system is described in conjunction with the following Figures in which like reference numerals are used throughout to identify the same components, wherein:

FIG. 7 is a sectional view taken generally along line 7—7 of FIG. 4 looking downwardly into the brew chamber mounted on the housing of the central brewing unit;

FIG. 8 is a sectional view of the brew chamber as shown in FIG. 7 taken long line 8—8 thereof and showing a basket and spacer means for holding a filter paper;

FIG. 9 is a sectional view of the brew chamber taken along line 9—9 of FIG. 7 showing a portion thereof wherein by-pass water is directed into the brew chamber from the by-pass valve;

FIG. 10 is a sectional view taken along line 10—10 of FIG. 7 and showing the actuator means portion of the brew chamber in closing contact position with a safety switch;

FIG. 11 is a sectional view taken along line 11—11 of FIG. 7 and showing a sloping drain channel at the bottom wall of the brew chamber which includes the discharge orifice therethrough at the lowermost point;

FIG. 12 is a front elevational view of the dial means for precisely adjusting the inlet valve timer;

FIG. 13 is a wiring diagram illustrating the relationships of the electrically operated components for the central brewing unit;

FIG. 14 is a top view of a satellite receptacle unit with the cover removed;

FIG. 15 is a plan view of a cover for the receptacle unit as shown in FIG. 14 and indicating in phantom lines an alternate arrangement for the location of the funnel inlet therethrough;

FIG. 16 is a side view of the cover shown in FIG. 15;

FIG. 17 is a perspective view of the locking means arranged at the top of the satellite receptacle unit for securely fastening a cover thereover;

FIG. 18 is a perspective view of a positioning means cooperative with the edge of the cover for the satellite receptacle unit whereby to facilitate aligning the funnel inlet in proper relation with respect to the discharge orifice of the brew chamber; and, FIG. 19 is a sectional view of a lower portion of a sight gauge means mounted with the satellite receptacle unit and further showing a restrictor means cooperative therewith to impede the outward flow of coffee therefrom upon opening the satellite unit spigot.

DETAILED DESCRIPTION OF THE PREFERRED EMBODIMENT

Introduction

Figure 1:
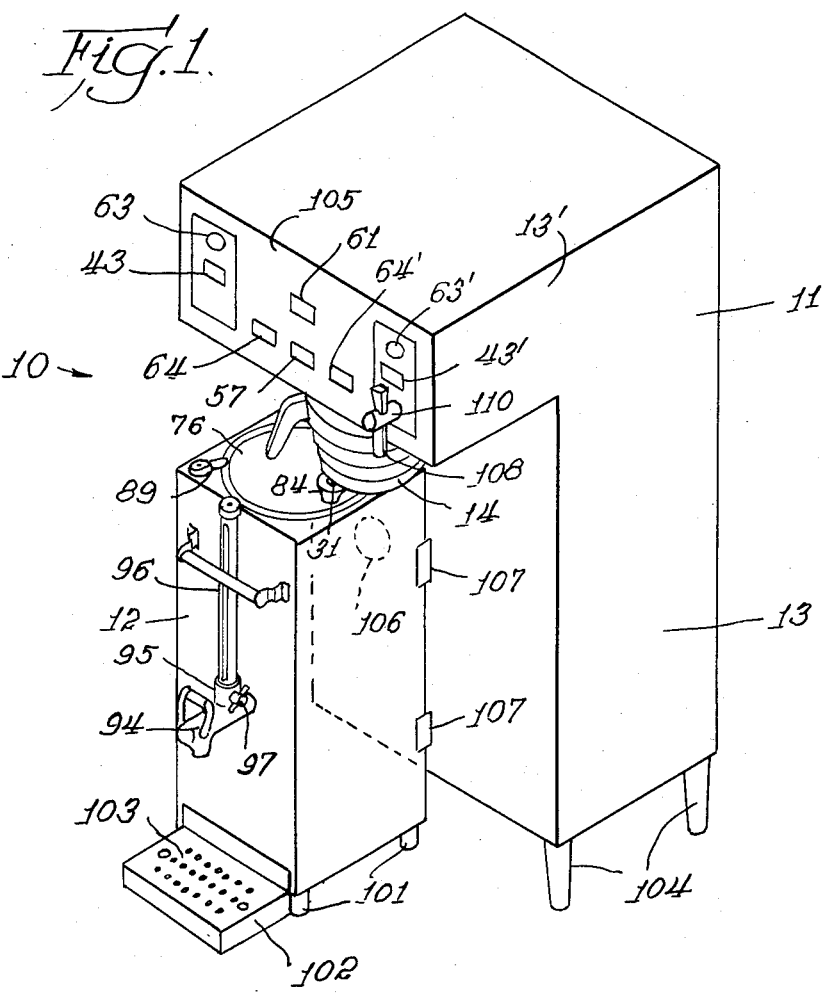
FIG. 1 is a perspective view of the satellite coffee brewing system showing a satellite receptacle unit positioned for receipt of coffee at one discharge position of a central brewing unit.

The purpose and operation of the invention will be clear when first viewing FIG. 1 wherein a satellite coffee brewing system 10 is illustrated and includes a central brewing unit 11 for brewing hot coffee and discharging the brewed coffee into a satellite receptacle unit 12 arranged therewith in one of two filling orientations provided in this exemplary embodiment. An essentially identical satellite receptacle unit (not shown) may be placed at the other filling position next to the brewing unit 11. The coffee may be dispensed while the satellite receptacle 12 remains stationed at brewing unit 11 or it may be transported to a remote site, such as a window service unit. The brewing unit 11 is formed with a water tank housing 13 and a generally transversely arranged upper basin housing 13'. The basin housing 13' is associated with a brew chamber 14 which holds a fresh load of coffee grounds to be brewed.

It will be understood that the invention provides for a very efficient space-saving system wherein, in preferred form, at least two satellite units 12 may be stationed adjacent the housing 11 whereby to be sequentially filled from brew chamber 14. The position of the brew chamber 14 is adjustable for the discharge of hot coffee at either a left or right discharge orientation.

Figure 2:
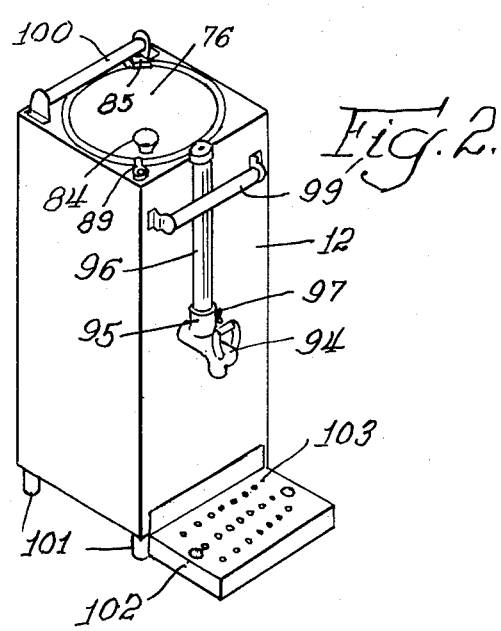
FIG. 2 is a perspective view of a substantially identical satellite receptacle unit ready to be positioned with the central brewing unit of FIG. 1 adjacent the other satellite unit.

FIG. 1 is exemplary of the utilization of system 10 wherein the right discharge station is available next to the satellite unit 12 shown for the filling of an empty second satellite unit 12, such as the one illustrated in FIG. 2. By utilizing more than two satellite units 12, a filled satellite unit may be removed for service elsewhere and an empty satellite unit may take its place ready to receive a batch of coffee.

Adjustable Brew Chamber and Safety System

With reference now made to FIGS. 4, 7, 8 and 11, the adjustable position brew chamber 14 may be described in detail. It will be understood with first reference to FIG. 4, that the central brewing unit 11 of the satellite coffee brewing system 10 provides a siphon-type system which ultimately emits hot water into the adjustable brew chamber 14. The brewing unit 11 includes a hot water tank 15, cold water basin 16 and a timed inlet valve means 17. A separate hot water system 109, as described in my co-pending U.S. patent application Ser. No. 633,417, filed July 23, 1984, independently provides hot water for making hot tea, or the like, at a hot water faucet assembly 110 extending outwardly of the basin housing 13'. Upon the initiation of a brew cycle, the timed inlet valve means 17 opens for a pre-set duration whereby to introduce cold water into the basin 16. In turn, the cold water is directed downwardly from the basin to be introduced into the tank 15 from a cold water inlet pipe 18 arranged to open near the bottom portion of the tank 15. Water contained in the tank 15 is maintained at a predetermined temperature by the utilization of a thermostatically controlled and electrically energized heating element 19. Thereby, when cold water is introduced from the inlet tube 18, hot water is displaced at the top of the tank 15 and siphoned through a siphon tube means 20 which conveys the water to a spary head assembly 21 for discharge into the brew chamber 14. A cover 22 is arranged at the top of the tank 15 to seal the tank and also provide means for mounting a pair of electrical terminals 23 and 23' of the heating element 19.

An important characterizing feature of the invention is the ability of brew chamber 14 to discharge coffee in at least two discharge positions. It will be seen when viewing FIGS. 7 and 8 that the undersurface of the basin housing 13' includes a pair of opposing channel-shaped members 24 and 25. The members 24 and 25 provide means for removably mounting the brew chamber 14. The adjustable brew chamber 14 has a tapering side wall 26 which downwardly narrows in diameter and terminates at the bottom thereof in an integrally formed bottom wall 27. At the top edge of the side wall 26, an outwardly extending peripheral mounting flange 28 is formed for sliding engagement within the opposing channel members 24 and 25. By this slide action the brew chamber 14 may thus be easily positioned below spary head assembly 21.

A handle means 29 is affixed to the brew chamber 14 in a conventional manner whereby the brew chamber 14 may be hand-carried and positioned as needed.

Figure 4:
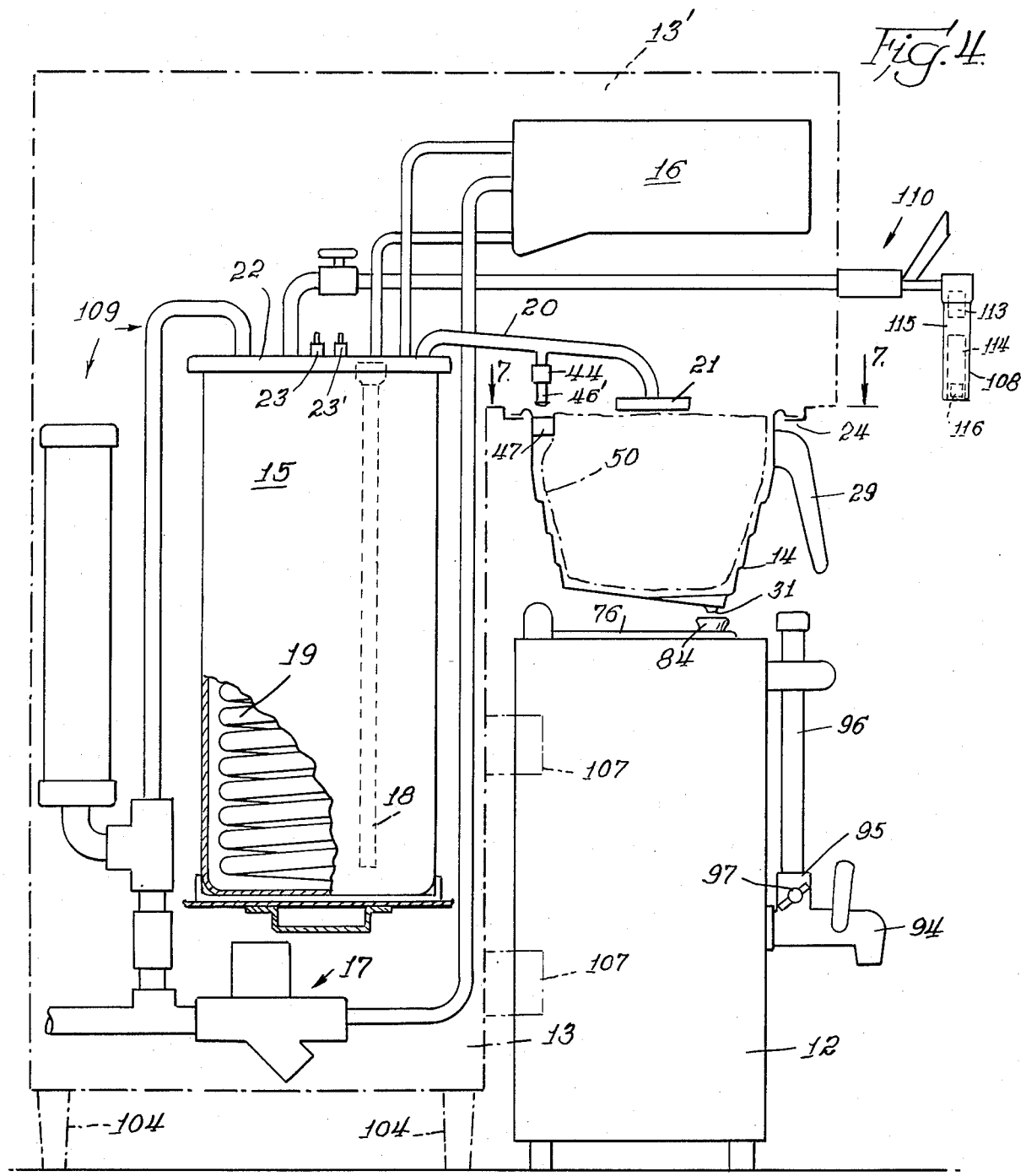
FIG. 4 is a schematic view of the internal water flow system for the central brewing unit as shown in FIG. 1 and having a satellite receptacle unit in position for receipt of brewed coffee discharged from a brew chamber.
Figures 5, 6:
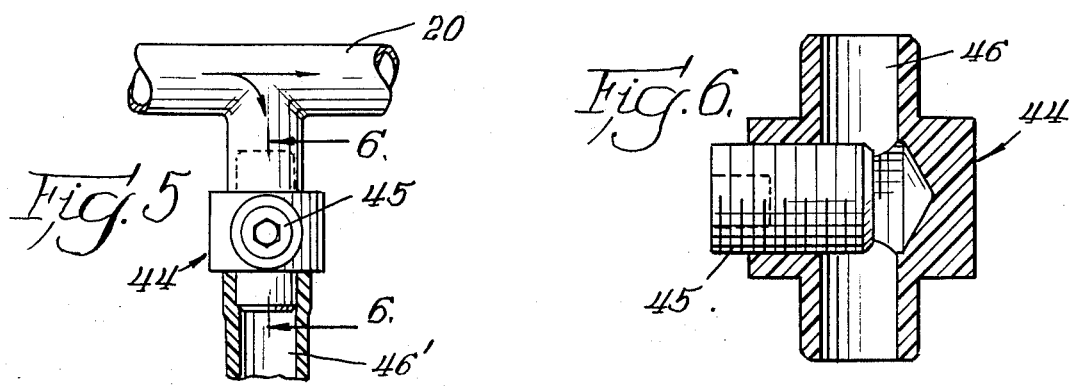
FIG. 5 is a front elevational view of a portion of the siphon tube means including a by-pass valve arranged therealong for by-passing clear water into the brew chamber.
FIG. 6 is a sectional view of the by-pass valve shown in FIG. 5 taken along line 6—6.

The bottom wall 27 is radially tapered toward the center whereby to provide a center sump for the efficient collection of brewed coffee. Extending radially from the center of the bottom wall 27, a sloping channel 30 is formed which extends toward the side wall 26 to have its lowermost point adjacent the side wall 26. At this lowermost point, the bottom wall 27 includes a discharge orifice 31 which receives therethrough the brewed coffee for the ultimate draining of the coffee from the brew chamber 14 into a satellite receptacle unit 12, as shown in FIG. 4. It will be noted, with reference to FIGS. 7 and 8, that in the preferred embodiment the sloped channel 30 is radially arranged with the handle means 29 whereby to locate the discharge orifice 31 off-center from the bottom wall 27 and close to the side wall 26. In this relationship, a simple rotating motion of the handle means 29 serves to move the discharge orifice 31 through an arc. In preferred form, the discharge orifice 31 is constrained to move in an arc of about 100°. The illustrative embodiment of brewing system 10 provides for the positioning of the discharge orifice 31 into two discharging positions. Thus, left and right positioned satellite units 12 may be sequentially filled with brewed coffee by simply moving the handle means 29 from one position to the other for a brewing cycle at each position. The means for properly positioning the brew chamber 14 at each discharge orientation is provided by the cooperative effort of positioning pins 32 and 33 extending downwardly from the basin housing 13' along an arc traversed by a stop means 34 formed along the mounting flange 28 and extending outwardly from the circumferential edge 35 thereof. As best viewed in FIG. 7, it will be observed that the stop means 34 has been moved to contact pin 33 for the left-filling orientation as shown in FIG. 1. It will be clear that upon completion of the filling of a left-positioned satellite unit 12, the brew chamber 14 may simply be removed outwardly of the channel members 24 and 25 and loaded with a fresh batch of coffee. Thereafter, by grasping the handle means 29, brew chamber 14 is again slid into mounting alignment with the channel members 24 and 25 and then rotated to the right whereby to dispose the stop means 34 at pin 32. As a result, the discharge orifice 31 would then be positioned for a right-positioned satellite unit 12. As will be hereinafter explained, the satellite units 12 include inlet means which are adjustable for vertical alignment below the discharge orifice 31 at either of said discharge positions.

Inasmuch as the invention is directed for use in commercial establishments, it is necessary that the satellite coffee brewing system 10 offer a safe and very efficient construction whereby human error in its operation is minimized. In this regard, the system 10 provides means for preventing the initiation of a brewing cycle unless the discharge orifice 31 properly registers above the inlet for a satellite unit 12 to be filled. Attention is directed to FIGS. 7 and 8 wherein the positioning stop means 34 is formed with switch actuator means comprising a raised center section 36. At each discharge position, a safety switch assembly means 37 is arranged for contact by the raised portion 36. With reference now made to FIG. 10, it will be seen that the safety switch assembly means 37 includes, in preferred form, microswitches 38 mounted interiorly of the basin housing 13'. Each of the microswitches 38 is normally open and includes an actuating pin 39 which when depressed in a conventional manner closes the swtich 38. The actuating pins 39 extend slightly below the basin housing 13' and are cooperative with pivoting arms 40. The pivoting arms 40 are mounted to the housing 13' at pivot posts 41 and project therefrom into the arcuate path of travel of the stop means 34 and the raised portion 36. The pivoting arms 40 terminate in a convex dimpled end 42 for the purpose of positively contacting the raised surface 36. An upward movement of a pivoting arm 40 caused by the abutment with the raised surface 36 presses the pivoting arm 40 against the actuating pin 39 to close microswitch 38. Additionally, the convex dimpled portion 42 of each of the pivoting arms 40 is positioned whereby to be contacted by the raised surface 36 only upon positioning the brew chamber 14 to place the stop means 34 into contact with either pin 32 or pin 33 at the selected discharge position. Should the brew chamber 14 be misaligned, the raised portion 36 will not register to abut the dimple 42 and accordingly the associated microswitch 38 will remain open.

With reference now made to the wiring diagram shown in FIG. 13, it will be seen that the microswitch 38 is wired in series with a brew cycle switch 43 for the left-hand discharge position and a microswitch 38' is wired in series with a brew cycle switch 43' for the right-hand discharge position. Unless the appropriate microswitch is closed by the depression of the actuating pin, the associated brew switch will not be capable of completing the circuit for the initiation of a brew cycle. The safety switch assembly means 37 assures that a restaurant employee cannot begin a brew cycle until the brew chamber 14 is properly aligned for discharge into an empty satellite unit 12 therebelow.

Hot Water By-Pass System

The satellite coffee brewing system 10 further provides means for by-passing a percentage of the siphoned water rather than directing it through the spray head assembly 21 during a brew cycle. The brew chamber 14 includes means for receiving and by-passing this percentage of water in cooperation with a by-pass valve 44 arranged along the siphon tube 20 upstream of the spray head assembly 21. The by-pass valve 44 is accordingly in fluid communication with the hot water being siphoned from the hot water tank 15 as it is conveyed to be emitted from the spray head assembly 21. This by-pass arrangement is best viewed in FIGS. 4–7 and 9. The by-pass valve 44 is, in the preferred embodiment, a metering valve which provides a thread engageable stem means 45 mounted transversely therewith to open or close a passageway 46 extending through the valve 44. The valve 44 is arranged to be located generally above the mounting flange 28 of the brew chamber 14 but slightly inwardly thereof. A connecting drain tube 46' is connected with the valve 44 and extends downwardly to project through the basin housing 13'. The by-pass water is discharged to flow into the brew chamber 14 generally along the side wall 26 as shown in FIG. 9. By turning the stem means 45, the amount of by-pass water may be varied by a simple clockwise or counterclockwise rotation to restrict or enlarge the cross-section of the passageway 46. In preferred form, the satellite coffee brewing system 10 provides about seven quarts (6.62 liters) of coffee per brew cycle. Depending upon the particular water softening conditions in a particular location, the amount of by-pass water required to prevent overextraction of the coffee grounds is in the range of from about 25% to about 52% of the hot water conducted through the siphon tube 20. As will be explained hereinafter, the satellite coffee brewing system 10 also provides means for varying the amount of coffee brewed per cycle. Accordingly, as the amount might change, or as softening conditions vary, the utilization of the adjustable by-pass valve 44 makes possible the adjustment to an appropriate percentage of by-pass water and ensures that the coffee grounds are not overextracted to result in bitter tasting coffee.

As the by-pass water is discharged downwardly from the drain tube 46', it is prevented from impinging upon the coffee grounds in the brew chamber 14 by the cooperation of unique spacer means 47, side wall steps 48 and a basket means 49 arranged inside the brew chamber 14. As is usual in coffee making procedures, the brew chamber 14 is adapted to receive a filter paper 50. However, the filter paper 50 is maintained to be spaced inwardly from the side wall 26 whereby the by-pass water received from the drain tube 46' flows between the filter paper 50 and the side wall 26 to be ultimately directed to the sloping channel 30 and then drained outwardly via the discharge orifice 31 without immersing the coffee grounds inside filter paper 50. Specifically, it will be observed that the spacer means 47 are bracket-shaped members affixed at two locations on the brew chamber 14 generally near the top thereof. These locations correspond to the vertical position of the discharge tube 46' when the adjustable brew chamber 14 is moved to either of the left or right discharging positions. As best viewed in FIGS. 7 and 8, the spacer means 47 urge a section of the upper portion of the filter paper 50 to be creased inwardly of the brew chamber 14 and thereby create a clear vertical path for the stream of by-pass water entering from above. The by-pass water flow is thus prevented from impacting upon the upper edge of the filter paper 50 which might otherwise soak the filter paper and cause it to randomly fold and permit the by-pass water to inadvertently enter the coffee grounds therein.

The cooperative effort of the side wall steps 48 and the wire basket 49 results in the effective by-passing of the clear water to the discharge orifice 31. With particular reference now made to FIG. 8, it will be seen that the side wall 26 is formed with a plurality of steps 48 which are vertically separated and extend around the side wall 26. The wire basket 49 includes a bottom frame member 51 which is adapted to fit within a slightly smaller diameter notch 52 formed around the side wall 26 generally adjacent the bottom wall 27. The wire basket 49 additionally comprises a plurality of downwardly depending loop segments 53 and 53' which taper downwardly and inwardly and are peripherally connected by the plurality of spaced apart side frame members 54 and also by the bottom frame member 51. The side frame members 54 and bottom frame member 51 are discontinuous and terminate to form a gap 55 whereby one of the loops 53' is outwardly open at gap 55 and is not trasversed by the side frame members 54 or bottom frame member 51. Thereby, the wire basket 49 may be pinched at a pair of concave finger-grip portions 56 formed near the bottom portion of the open loop 53' whereby the diameter of the bottom frame member 51 may be momentarily shortened by pinching the portions 56 to enable a resilient engagement with the notch 52, as shown in FIG. 8. None of the other frame members 54 or loop segments 53 and 53' contacts the side wall 26 during engagement with the brew chamber 14 whereby a space 111 is formed between the stepped side wall 26 and the filter paper 50. It has been determined that the inward spacing created at 111 is necessary in order to accommodate the filter paper 50 which tends to bulge outward of the basket 49 when soaked with brewing water. Without the provision of space 111, the filter paper 50 could bulge outwardly to lie against the side wall 26 and impede the flow of the by-pass water downwardly to the discharge orifice 31.

Since the wire basket 49 is resiliently held within the brew chamber 14, the filter paper 50 and coffee grounds therein may simply be dumped from the brew chamber 14 following a brew cycle while the basket 49 is held firmly in place for receipt of a new filter paper 50 and subsequent load of fresh coffee grounds. Should cleaning be required at the end of a business day, the operator may simply pinch the finger-grip portions 56 and contract the frame member 51 for disengagement with the notch 52.

High Capacity Heater Arrangement

During peak hours in a restaurant, a large number of coffee servings may be required over a short period of time. In order to meet this demand, a large volume brewing system must also be capable of quickly recovering for the next brewing cycle. This recovery period involves the time needed to re-heat the water in the hot water tank 15 in order for it to be brought back to the usually prescribed brewing range of from about 195° F. (90.6° C.) to about 208° F. (97.8° C.) from the cooler temperature caused by the cold inlet water. The present invention satisfies this goal of quick re-heating by the provision of a high capacity heating circuit arrangement and the utilization of a heating element having greater than the 3600 to 4800 watt capacity typically found in present 220-240 volt A.C. systems. In preferred form, the hot water tank 15 has a four gallon (15.14 liters) capacity whereby almost one-half of the water is siphoned therefrom during a single brewing cycle. As the hot water is extracted, a contemporaneous admission of cold water is inletted thereto via the inlet valve means 17 for ultimate introduction into the bottom of the container 15 through the inlet tube 18. Thus, the brewing of coffee, the inletting of cold water and the thermostatically controlled re-heating of the water inside the tank 15 will occur simultaneously. In the exemplary embodiment, the heating element 19 is a 5500 watt sheathed heating coil which can draw in excess of about 24 amperes with a standard 220-240 volt A.C. power supply. It has been found that by using this high wattage element, the water in the tank 15 can be re-heated usually in less than ten minutes from the start of a brewing cycle, which cycle typically takes about seven to eight minutes from start to finish to brew seven quarts (6.62 liters) of coffee. The recovery period has been found to be even shorter when line voltage drops are not experienced and a constant 220-240 volt circuit is maintained. Under optimal current conditions, brewing system 10 can be ready to again brew coffee immediately after a used load of coffee grounds is discarded and the loading of a fresh batch of coffee grounds into the brew chamber 14 is completed. In commercial establishments, line voltage drops can occur due to the variety of electrical apparatus being used. Thus, it is important to maintain the ability for a quick recovery of ten minutes or less even when line voltage may drop to as low as 200 volts. The present invention makes this possible.

The utilization of a higher rated heating element has presented a problem with the overheating of the control components in a brewing system, such as the thermostats, switches, timers and signal lights typically used. The present invention provides separate 110-120 volt circuitry for these control components and they need not have a higher capacity as would be required for use in the higher voltage heating element circuit. Therefore, with particular attention directed to FIG. 13, it will be seen that the heating element 19 is schematically shown in electrical communication with the power supply of 230 volts. A heater switch 57 is wired in series with a normally closed high limit safety thermostat 58 and running thermostat 59 in separate electrical communication with the 120 volt power supply. The running thermostat 59 is of the type that is adjustable and can be set to close the circuit when temperatures in the hot water tank 15 drop below the desired range of from about 195° F. (90.6° C.) to about 208° F. (97.8° C.) required for brewing coffee. A known oil-filled type sensing tube or bulb means arrangement (not shown) is connected to the running thermostat 59 and communicates interiorly of the tank 15 whereby the thermostat closes and opens in response to the expansion and contraction of the oil in the sensing means at the pre-set temperature. The high limit safety thermostat 58 operates to break the circuit when it senses an overheated condition at the tank 15. The heater switch 57 serves to open or close the thermostat circuit so that the operation of the central brewing unit 11 may be turned off during non-business hours and turned on at the opening of the business day. It will be seen that a timer and relay 66 (described below), the thermostats 58 and 59, and the switches 38, 43, and 57, are operated by the 120 volt power supply, whereas the heating element 19 is connected to the 230 volt power supply by a double pole, single throw, solenoid-type relay 60. In order for the running thermostat 59 to control the heating element 19, the relay 60 has one pair of terminals connected to the heating element 19 and 230 volt power supply and a second pair of terminals connected to the thermostat circuit and 120 volt power supply. The closure of the relay 60 occurs when the running thermostat 59 closes and energizes the solenoid of the relay 60, as schematically shown in FIG. 13, to thereby throw the double pole switch and close the 230 volt circuit. A water ready light 61 is, as shown, separately wired to the running thermostat 59 whereby the ready light 61 is in a closed circuit with the 120 volt power supply when the running thermostat 59 is open. When the water temperature drops below the pre-set level, the running thermostat 59 closes and thereby opens the running light 61 circuit whereby it is not illuminated to indicate to the operator that the water in tank 15 is not hot enough to brew coffee. As a result, the relay 60 carries the higher current to the heater 19 through one pair of terminals and is operated by the running thermostat 59 through the other pair of terminals whereby to responsively close and open the 230 volt circuit for the heater 19. Thus, the brewing system 10 prevents the thermostats, switches, lights and timers for overheating and also allows for the use of lower rated components drawing no greater than about 25 amperes, while still providing for the use of the high capacity heating element 19.

Quality Control Timer Means

One of the most important concerns of restaurant owners is the ability to serve good tasting hot coffee. It has therefore become necessary to monitor the age of a batch of coffee so that the restaurant employees do not inadvertently serve it after about 40–60 minutes from the time the batch was brewed.

In solution of this problem, the satellite coffee brewing system 10 provides a quality control timer circuit means and signal means, which permits the operator to closely monitor the age of the brewed coffee held in a satellite unit 12. As shown in FIG. 13, the timer circuit means comprises, in preferred form, a solid state timer 62 electrically communicating with the brew switches 43 and 43', whereby the timer 62 is activated upon the initiation of a brewing cycle by the activation of either of said brew switches. The timer 62 includes two separate solid state circuits, each of which is independently activated by the corresponding activation of the brew switch 43 or 43'. The signal means in the illustrated embodiment, comprise a pair of signal lights 63 and 63', which are independently illuminated by the activation of one of the separate circuits included in timer 62. As viewed in FIG. 1 it will be observed that the signal lights 63 and 63' are closely placed with the respective brew switches 43 and 43' to form a set of controls in corresponding relationship to each discharge position of the brew chamber 14. In the preferred embodiment, the timer 62 is a solid state timer, part no. TBL-T1B11-B10, made by National Controls Corporation. This timer, or its equivalent, would satisfy the requirements set forth herein. The timer 62 operates for a preferred forty minute duration during which the signal light 63 or 63' will be continuously illuminated following the initiation of a brew cycle at the respective discharge position. Sequential brew cycles at the two discharge positions will, as would be understood, set into motion two overlapping forty minute time sequences since the timer 62 includes the two said timer circuits—one for each said brew cycle switch 43 and 43'. The timer 62 additionally includes two corresponding sub-circuit means for pulsing a signal to each of the signal lights 63 and 63', which flash the signal lights on and off after their respective forty minute periods to alert the operator that the coffee has reached the time limit at which it should be disposed. The interval of time for flashing the signal lights is significantly less than the continuous illumination period and in the preferred embodiment is five and one-half minutes. Following the flashing interval, the signal lights are deactivated by timer 62 and by observing that a signal light is off the restaurant operator is clearly alerted to discard the batch of coffee.

If, during the course of the forty minute period, all of a particular batch of coffee has been served, the timer 62 further includes cancel switches 64 and 64', which deactivate the timer 62 and thereby shut off the signal light 63 or 63', respectively. Following a cancellation, the quality control timer circuit means is ready for re-activation at the initiation of a subsequent brew cycle.

Improved Water Inlet Control Adjustment

The satellite coffee brewing system 10 utilizes a conventional arrangement for the inlet control valve means 17 which comprises a solenoid valve 65 that is energized and de-energized by a solid state timer and relay 66. The timer and relay 66 is activated to begin its timing sequence upon the initiation of a brew cycle at brew switches 43 or 43'. The timer and relay 66 is adjustable in a known manner by the manual rotation of an adjustment stem means 67, as shown in FIG. 12. In the illustrative embodiment, the timer and relay 66 is set to energize the solenoid for a period of two minutes and twenty eight seconds in order to provide sufficient water for the brewing of seven quarts (6.62 liters) of coffee.

Since water inlet pressures may vary, it is necessary to be able to correspondingly vary the open time of the solenoid valve 65 to compensate for these differences in order to obtain the required amount of brewed coffee. Moreover, it is additionally beneficial to provide means for varying the amount of coffee to be brewed when more or less is desired. A problem with adjusting the time setting is that the rotation of the adjustment stem means 67 to the proper position is very imprecise and may result in the admission of too little or too great an amount of coffee. Turning the stem means 67 by only a few degrees can greatly vary the inlet water volume. The satellite coffee brewing system 10 therefore includes a calibrated dial 68 for precisely setting the timer and relay 66 whereby the length of time in which the solenoid valve 65 is open may be set to admit water within less than about two fluid ounces (59 ml.) of the normal seven quart (6.62 liters) brew volume. The calibrated dial 68 is mounted to the timer and relay 66 around the adjustment stem means 67. As shown, the dial 68 is provided with visual markings at four second intervals. In conjunction with the calibrated dial 68 an indicator means is provided for precisely rotating the adjustable stem means 67 to the proper time setting and comprises a knob 69 having a pointer 70 affixed to the periphery thereof. The knob 69 is mounted to the adjustment stem means 67 to facilitate a precise incremental rotation of the pointer 70 to a desired time setting on the dial 68.

The restaurant operator will therefore be able to monitor the number of ounces (ml.) of coffee produced for each brew cycle. If more or less coffee is required, the operator can then easily calculate and set the exact time required to admit the necessary volume of cold water. The trial and error experimentation that was previously required to find the correct timer setting is eliminated by the arrangement of the calibrated dial 68 and knob 69 with the timer and relay 66.

Satellite Receptacle Unit

The satellite receptacle units 12 will best be understood with reference to FIGS. 1-3 and 14-19. In the preferred form, the satellite coffee brewing system 10 includes at least the same number of satellite units 12 as there are discharge positions for the central brewing unit. As illustrated, the central brewing unit 11 has two discharge positions for the brew chamber 14 and accordingly at least two satellite receptacle units 12 are provided whereby they may be placed side-by-side below the basin housing 13' for sequential receipt of hot brewed coffee from the brew chamber 14.

The satellite units 12 have a generally rectangular prismatic shape formed by four vertical side walls 71, a bottom wall 72, and an upper wall 73. Upper wall 73 includes a circular opening 74 therethrough. A reservoir 75 is arranged interiorly of the satellite unit 12 and depends from the upper wall 73 below the opening 74. The reservoir 75 is upwardly open and communicates outwardly of the unit 12 through the opening 74. A void space 112 is defined between the reservoir 75 and walls 71, 72 and 73. The reservoir 75 is insulated by an insulating material filling the void 112. Preferably a foamed urethane is envisioned for this purpose.

An insulated cover 76 is sized to removably fit over the opening 74 and thereby cover the reservoir 75. The cover 76 is preferably formed to have a double wall construction wherein an upper wall 77 is circumferentially weld engaged to a bottom wall 78 whereby to form an outward projecting peripheral seam 79. The peripheral seam 79 overlaps the periphery of opening 74 to thereby sealingly cover the reservoir 75 therebelow. Holes 80 and 81 extend through the top wall 77 for the introduction of an insulation material into a void space 82 defined between the wall 77 and 78. Again, a foamed urethane is the preferred insulating material. The holes are capped, as shown in FIG. 16, following the insertion of the insulating material.

An inlet 83 is formed through the cover 76 for the passage of coffee therethrough to enter the reservoir 75. A funnel 84 is arranged around the inlet 83 for the sure receipt of coffee discharging from the brew chamber 14.

Figure 3:
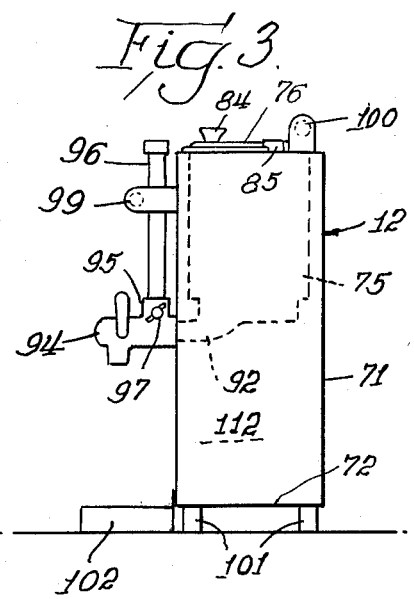
FIG. 3 is a side view of the satellite receptacle unit as shown in FIG. 2.

Each satellite receptacle unit 12 is adapted for use at either the left or right discharge position of central brewing unit 11, as best viewed in FIGS. 1-3. The cover 76 is adjustable into two orientations at the opening 74 whereby to dispose the funnel 84 in vertical alignment below the discharge orifice 31 in either discharge position. This adjustment is made possible by the provision of a stop means 85 arranged on the top wall 73. In the illustrative embodiment, the stop means 85 is a generally block-shaped piece of steel having an outward projecting ledge 86. The stop means 85 is affixed to the top 73 in a position to dispose the projecting ledge 86 at the circumferential edge of opening 74. Correspondingly sized flat notches 87 and 88 are provided along the peripheral seam 79. The flat notches 87 and 88 are spaced apart and the funnel 84 may thereby be located in two positions over the reservoir 75. These two funnel positions vertically align the funnel 84 with the discharge orifice 31 in positional correspondence to the two discharge positions of brew chamber 14. As will be appreciated when viewing FIGS. 14 and 15, upon the engagement of the flat notch 88 with the stop means 85, the funnel 84 is in the left-fill orientation as shown in FIG. 1. In order for the satellite unit 12 to be arranged for the receipt of brewed coffee in the right-fill orientation depicted in FIG. 2, the cover 76 is lifted and turned to engage the flat notch 87 with the stop means 85. The funnel 84 is then in the position shown in phantom at 84' of FIG. 15.

Once the cover 76 is properly aligned at the selected discharge position, it may be secured to the top wall 73 by a locking means 89 arranged thereon to be adjacent the circumference of the peripheral seam 79. As shown in FIGS. 14 and 17, the lock means 89 comprises a pivoting base 90 formed with a raised projecting tongue 91 which is spaced upwardly from the base 90 whereby to be capable of overlying the projecting peripheral seam 79 and thereby secure the cover 76 around the opening 74 to sealingly cover the reservoir 75 therebelow.

The satellite receptacle units 12 further include a drain means 92 which fluidly communicates with the reservoir 75 at a trough 93 formed in the bottom thereof to facilitate drainage. The drain means 92 extends outwardly of the side walls 71 and terminates in a manually operable spigot means 94. The spigot means 94 is of a known design and is formed to include an upstream T connection 95 that opens upwardly therefrom. The T connection 95 provides for the connection of a sight gauge means 96 whereby the sight gauge means 96 is in fluid communication with the interior of the reservoir 75. Thereby, a portion of the coffee in the reservoir 75 flows through the drain means 92 and upwardly into the sight gauge means 96. As would be understood, the head of the liquid in the reservoir 75 causes the sight gauge means 96 to be filled to the same elevation therein. Thus, the restaurant operator may monitor the amount of coffee that has been dispensed. The T connection 95 further includes a shut-off valve 97. The valve 97 ensures that coffee service can continue should the sight gauge means 96 be rendered inoperable due to breakage, or the like. For the purpose of minimizing the potential for breakage, the invention provides for the use of a plastic sight gauge means 96, instead of the typical glass construction. The plastic envisioned for use is preferably polysulfone.

The invention assures serving hot coffee from the interior of the reservoir 75 and substantially prevents the flow of cooler coffee from the sight gauge means 96 through the spigot means 94 when it is opened. Since the sight gauge means 96 is mounted at the exterior of the the satellite unit 12 and is subjected to ambient air temperatures, the coffee therein may be substantially cooler than that which is in the reservoir 75. In order to impede this flow from the sight gauge means 96, a restrictor gasket 97 is disposed generally at the bottom end of the sight gauge means 96 interiorly of the T connection 95. The restrictor gasket 97 includes a small orifice 98 having a size substantially less than the cross-section of the sight gauge means 96. While the coffee from the reservoir 75 is permitted to enter the sight gauge means 96 for monitoring the level therein, the restrictor gasket 97 prevents a quick downward rush of coffee upon the opening of the spigot means 94. The restaurant operator will be certain that the coffee dispensed into the coffee cup will be substantially at the same temperature as in the reservoir 75.

To facilitate transporting the satellite unit 12 to remote locations from the central brewing unit, a pair of handle means 99 and 100 are provided so that a restaurant employee may first grasp the frontwardly disposed handle means 99, slide the satellite unit outwardly from the central brewing unit 11, and thereafter grasp the rearwardly disposed handle means 100 to sure-handedly carry the satellite unit to a remote service station elsewhere in the restaurant.

As can be seen from FIGS. 1–3, the satellite coffee brewing system 10 may include leg means 101 attached below the bottom wall 72 of the satellite units 12 in order that the bottom wall 72 may be spaced above a cooler resting surface, such as a countertop as shown in dashed lines in FIG. 3. Also, a hollow and portable drain plate means 102 may be provided to be arranged adjacent the front of the satellite unit 12 whereby an upward facing removable grate 103 thereof is positioned below the spigot means 94 in order to catch and hold therein any spilled coffee which might result during the filling of a coffee cup or the like.

The height of the satellite units 10 are sized whereby to dispose the funnel 84 preferably at less than one inch (2.54 cm.) below the discharge orifice 31 of brew chamber 14. The hot flow of coffee discharging through the orifice 31 will then immediately pass through the inlet 83 into the reservoir 75 so that the coffee is subjected to a minimal amount of exposure to cooler ambient air temperature.

Additional Improvements For Use In Commercial Establishments

Because the satellite units 12 are portable, the standard health and sanitary codes do not require a spacing therebelow. However, in order to meet a typical four inch (10.2 cm.) spacing requirement for coffee brewers, the satellite coffee brewing system 10 provides for the inclusion of leg means 104 attached below central brewing unit 11 for cleaning therebelow.

In preferred form, the width of the water tank housing 13 is about fifteen and one-half inches (39.4 cm.) to provide a very compact construction that is capable of accommodating two satellite receptacle units 12, each having a reservoir 75 adapted to hold seven quarts (6.62 liters) of coffee. The width of each of the satellite units 12 is about one-half of the width of the water tank housing 13 whereby two satellite units 12 may be arranged for receipt of brewed coffee without projecting sidewardly of the water tank housing 13. The strictest industry requirements for compact size are thereby met.

In preferred form, the satellite coffee brewing system 10 has a depth less than standard size work counters whereby the discharge spigot 94 does not project counter-outwardly and therefore does not risk the potential for spillage onto cup racks or the like, arranged below the countertop.

The central brewing unit 11 further includes a front control panel 105 for accommodating the switches and lights, as shown in FIG. 1. Thereby, the control components for the brewing unit 11 are conveniently located for ease of operation. In order to facilitate the precise adjustment to the timer and relay 66, the front face of the water tank housing 13 includes a covered aperture 106 in positional correspondence with the calibrated dial 68 and knob 69. As best viewed in FIG. 12, the cover is removable to expose the calibrated dial 68 to the operator whereby the operator can simply make the manual adjustment of the timer and relay 66 as needed.

As an aid to aligning a satellite unit 12 with its funnel 84 properly below the discharge orifice 31, the invention optionally includes a pair of alignment plates 107 which are spaced along the center line of the water tank housing 13. The satellite receptacle units 12 are positioned by the operator to contact these alignment plates 107, which facilitates properly disposing the funnel 84 directly below the discharge orifice 31 in either the left or right discharge position, as shown in FIG. 1.

It will be also observed that the locattion of the hot water faucet assembly 110 is placed near the right hand set of controls, namely the brew switch 43' and signal light 63', whereby to be offset from the brew chamber 14 so that the brew chamber 14 is freely adjustable and removable. The hot water faucet 110 may optionally include an extender means 108 so that a coffee cup or cup of tea may be filled generally at eye level allowing the restaurant employee to peer downwardly into the cup for observance of the admission of the proper volume of hot water to the cup.

In the preferred embodiment, the extender means 108 is adapted to connect with an outlet tube 113. The outlet tube 113 is secured to the faucet assembly 110 for discharge therefrom in a known manner. The extender means 108 is sized to snugly slip over the outlet tube 113 and preferably comprises a flexible material such as silicone rubber. Interiorly of extender means 108 there resides a rigid insert tube 114 which is spaced below outlet tube 113 to provide a flexible hinge portion 115 for extender means 108 therebetween.

At the lower discharge end of the extender means 108, a stream straightener 116 is tightly fit inside the end of the rigid insert tube 114. In the exemplary embodiment, the outlet tube 113, the rigid inert tube 114 and the stream straightener 116 are made of stainless steel for sanitary reasons. It will be appreciated that the extender means 108 insulates the rigid insert tube 114 and thus, during the discharge of hot water from faucet assembly 110, the hands of the operator are kept from contacting the heated insert tube 114.

The flow of water is controlled to provide a non-splattering stream by the cooperation of the insert tube 114 and straightener 116 and thereby create a very neat and even flow into a cup, or the like. Also, the insert tube 114 maintains the extender means 108 in a stable, vertical alignment for the safe and efficient discharge of the hot water. Should the extender means 108 be accidentally bumped, for example by the operator during the positioning of the brew chamber 14 or a satellite unit 12, it is allowed to conveniently flex at hinge portion 115 and thereby will not present an obstacle to this positioning, but rather pivots when contacted to compensate for these accidental impacts. Due to the presence of the rigid insert 114, the extender means 108 will be caused to pivot back into its straight, vertical orientation following the inadvertent contact by the operator.

The length of extender means 108, and accordingly the length of the rigid insert 114, may be varied so that the discharge elevation of straightener 116 may be disposed at different heights as might be needed in particular restaurant operations. In the disclosed embodiment, the extender means 108 has a length of about four inches (10.16 cm.).

It will be appreciated that the satellite coffee brewing system 10 requires no additional warming plate structures and related electrical components. Therefore, the satellite units 12 are easily arranged against the flat front face of the water tank housing 13 and spatially cooperate with the brewing unit 11 to attain a very compact nested arrangement for the brewing and serving operations.

What is claimed is:

1. A satellite coffee brewing system comprising:
    a central brewing unit including
        a housing,
        a water tank means interiorly of said housing and associating with a heating means, said tank means being in fluid communication with a cold water inlet valve means for the admission of water thereto,
        a siphon tube means for discharging hot water displaced from the tank means upon the admission of inlet water at said inlet valve means,
        a spray head assembly associating with said siphon tubes means and adapted to receive siphoned water therefrom and for discharging said water to a brew chamber,
        means for removably mounting a brew chamber to the exterior of said housing to be in fluid communication with said spray head assembly,
        an adjustable brew chamber for holding coffee grounds and being removably mounted at said mounting means, said brew chamber including a discharge orifice at the a bottom thereof and the brew chamber being capable of adjustment whereby to position said discharge orifice into at least two discharge positions,
        safety switch means controlling the initiation of a brewing cycle and being arranged to be closable by the brew chamber upon the positioning of the brew chamber at one of said discharge positions;
    a plurality of satellite coffee receptacle units having an insulated coffee-holding reservoir therein and adjustable cover means thereover, said satellite units including spigot means for the dispensing of coffee therefrom, said satellite units further being interchangeable and capable of being arranged with said central brewing unit for receipt of brewed coffee from any of said discharge positions of said brew chamber, wherein at least two said satellite units are capable of being simultaneously arranged with said central brewing unit for sequential receipt of brewed coffee and having a combined width no greater than the width of said central brewing unit housing, said satellite units further being free standing and portable wherein the satellite units are adapted to dispense coffee while arranged at the central brewing unit and transportable to remote locations for dispensing coffee remote from the central brewing unit.

2. A satellite coffee brewing system as claimed in claim 1 wherein the siphon tube means includes a by-pass valve upstream of the spray head assembly, said by-pass valve being arranged to discharge a portion of the siphoned water into the brew chamber separately from the spray head assembly.

3. A satellite coffee brewing system as claimed in claim 2 wherein the adjustable brew chamber includes by-pass means for receiving the water from the by-pass valve and directing the water through the brew chamber separately from the water discharging from the spray head assembly.

4. A satellite coffee brewing system as claimed in claim 3 wherein the adjustable brew chamber comprises a side wall integrally formed with a bottom wall and being open at the top, the bottom wall including said discharge orifice therethrough wherein the orifice is off-centered and arranged generally close to the side wall than to the center of the bottom wall, said brew chamber being adapted to receive a filter paper for holding a load of coffee grounds therein, and wherein said by-pass means comprises
    a plurality of vertically separated steps extending around said side wall,
    a removable basket means insertable into said brew chamber for holding a filter paper therein whereby to be spaced from said side wall,
    at least two spacer means arranged at said side wall generally adjacent the open top of the brew chamber,
    said spacer means having openings therethrough for passage of by-pass water emitted from said by-pass valve and being adapted for spacing a portion of top edge of the filter paper inwardly of the side wall out of the path of the by-pass water discharging from the by-pass valve,
    said spacer means being arranged at said side wall whereby one said spacer means is in positional correspondence with said by-pass valve upon the orientation of said brew chamber into any said discharging position,
    whereby the by-pass water is directed to freely flow downwardly over said steps and around the side wall between the filter paper and side wall to ultimately pass under the filter paper and be discharged from said discharge orifice.

5. A satellite coffee brewing system as claimed in claim 4 wherein said by-pass valve comprises a metering valve being adjustable to vary the percentage of water to be by-passed.

6. A satellite coffee brewing system as claimed in claim 4 wherein the basket means comprises a flexible wire frame basket having a bottom frame member capable of resiliently engaging the side wall generally adjacent the bottom wall.

7. A satellite coffee brewing system as claimed in claim 1 wherein the adjustable brew chamber includes a handle means and the brew chamber has a side wall formed with a bottom wall, said side wall tapering upwardly from said bottom wall to an upper edge thereof defining an open top of the chamber, said upper edge includes an outwardly directed mounting flange cooperative with the brewing unit mounting means, said brewing unit mounting means comprising a pair of opposing channel-like members spaced apart to either side of said spray head assembly whereby to receive therein said mounting flange and wherein upon the horizontal rotation of said handle means said brew chamber is rotatable relative to said spray head assembly, said discharging orifice being located at said bottom wall and arranged generally closer to the side wall than to the center of the bottom wall whereby the handle means is adapted to move the discharge orifice through an arc to position the orifice into at least two discharge positions whereby to enable the discharge of hot coffee into a satellite unit arranged for receipt of coffee at any of said discharging positions.

8. A satellite coffee brewing system as claimed in claim 7 wherein the bottom wall of the brew chamber is radially sloped to provide a lowermost drain sump generally at the center thereof.

9. A satellite coffee brewing system as claimed in claim 8 wherein the bottom wall further includes a downwardly sloped channel, wherein the discharge orifice is located at the low point thereof, whereby the by-pass water and the coffee brewed by the water from the spray head assembly directed through the coffee grounds are both directed to drain downwardly through said orifice.

10. A satellite coffee brewing system as claimed in claim 1 wherein the safety switch means comprises electrical switches each of which being arranged with said central brewing unit in correspondence with the position of said brew chamber at each said discharge position to be contacted and closed by said brew chamber upon the adjustment of said brew chamber to the respective discharge position, said central brewing unit includes a brew cycle switch for each said discharge position, said brew cycle switches each being wired in series to a corresponding safety switch means for each respective discharge position, wherein a safety switch means is closable by the brew chamber to complete a circuit for the initiation of a brewing cycle whereby the brew chamber is required to be positioned at one of said discharge positions for a brewing cycle to begin.

11. A satellite coffee brewing system as claimed in claim 10 wherein the electrical switches comprise microswitches and said brew chamber includes switch actuator means positioned thereon to facilitate contacting and closing one said microswitch upon the adjustment of said brew chamber into a discharge position.

12. A satellite coffee brewing system as claimed in claim 1 wherein the heating means for the hot water tank comprises an electrically energized heating element.

13. A satellite coffee brewing system as claimed in claim 12 wherein the heating element comprises a high capacity element of greater than 4800 watts.

14. A satellite coffee brewing system as claimed in claim 13 wherein the heating element energization is electrically controlled by a running thermostat, said running thermostat being cooperative with means for sensing the water temperature in the hot water tank and operates to open and close an electrical circuit whereby in response the heating element is alternately energized and de-energized, respectively, so that the water in the tank is maintained at the temperature setting of the running thermostat, said central brewing unit further including a safety relay means wired separately to said heating element and said running thermostat whereby a higher voltage current is passed through said heating element and a lower voltage current is passed through said running thermostat, wherein the relay means opens and closes the higher voltage circuit with said heating element responsive to the opening and closing of the lower voltage current circuit caused by said running thermostat, whereby the running thermostat is operated at said lower voltage current.

15. A satellite coffee brewing system as claimed in claim 14 wherein the heating element comprises up to about a 5500 watt element.

16. A satellite coffee brewing system as claimed in claim 15 wherein the hot water tank has a capacity of up to about four gallons (15.14 liters).

17. A satellite coffee brewing system as claimed in claim 16 wherein the satellite coffee brewing system provides up to about two gallons (7.57 liters) of coffee per brewing cycle said running thermostat is set to maintain the temperature of the water in the tank at a value in the range of from about 195° F. (90.6° C.) to about 208° F. (97.8° C.).

18. A satellite coffee brewing system as claimed in claim 17 wherein the heating element is capable of reheating the water in the tank to the said temperature range in less than about ten minutes after the start of a preceding brewing cycle.

19. A satellite coffee brewing system as claimed in claim 1 wherein the satellite units comprise an outer housing having an opening through an upper top portion thereof, an interior coffee reservoir arranged below said opening and having an open top communicating with the outside of the unit through the opening in the housing, said reservoir having a volume less than said housing and defines a void space between the housing and reservoir, insulation material being disposed in said void space, a removable cover means adapted to cover said open top of the reservoir, a drain means arranged generally at the bottom of said reservoir and extending outwardly of the housing, said drain means being connected to a spigot means for the controlled dispensing of coffee from said reservoir, said cover means including an inlet enabling the passage therethrough of coffee discharging from the brew chamber to enter said reservoir.

20. A satellite coffee brewing system as claimed in claim 19 wherein the outer housing, cover means and inner reservoir comprise stainless steel.

21. A satellite coffee brewing system as claimed in claim 19 wherein the cover means is adjustable into at least two positions, wherein said inlet may be arranged in at least two positions for receipt of coffee from said brew chamber in any of the corresponding discharge positions thereof.

22. A satellite coffee brewing system as claimed in claim 21 wherein the cover means associates with a locking means arranged on said outer housing whereby the cover may be locked over said reservoir to contain coffee held therein.

23. A satellite coffee brewing system as claimed in claim 19 wherein the drain means is in fluid communication with a hollow sight gauge means connected therewith exteriorly of the outer housing and extending upwardly therefrom whereby the sight gauge means communicates with the interior of the reservoir whereby the head of liquid in the reservoir causes the sight gauge means to be filled to an equal height so that the level of coffee in the reservoir may be visually monitored.

24. A satellite coffee brewing system as claimed in claim 23 wherein the sight gauge means includes a flow restrictor means generally at the bottom thereof whereby upon opening of the spigot means coffee in said sight gauge means is impeded from flowing outwardly therefrom and whereby the coffee dispensed from the valve means is at substantially the same temperature as the coffee held in the reservoir.

25. A satellite coffee brewing system as claimed in claim 23 wherein the sight gauge means is a hollow plastic tube.

26. A satellite coffee brewing system as claimed in claim 25 wherein the hollow plastic tube comprises polysulfone.

27. A satellite coffee brewing system as claimed in claim 19 wherein the cover means has a double-walled hollow configuration and the hollow is filled with insulation.

28. A satellite coffee brewing system as claimed in claim 27 wherein the insulation is a foamed urethane.

29. A satellite coffee brewing system as claimed in claim 19 wherein the insulation in the void space is a foamed urethane.

30. A satellite coffee brewing system as claimed in claim 19 wherein the outer housing has a generally rectangular prism shape.

31. A satellite coffee brewing system as claimed in claim 30 wherein the width of the outer housing is no greater than about one-half the width of the housing for the central brewing unit whereby at least two satellite units may be placed side-by-side in two discharge positions for receipt of brewed coffee from said brew chamber and whereby the combined width of the satellite units does not exceed the width of the central brewing unit housing.

32. A satellite coffee brewing system as claimed in claim 19 wherein the satellite units include support feet means capable of spacing the outer housing from a supporting counter surface in a restaurant.

33. A satellite coffee brewing system as claimed in claim 19 wherein the system further includes portable drain plate means positioned with said satellite units beneath said spigot means and capable of receiving coffee spilled during dispensing from said spigot means.

34. A satellite coffee brewing system as claimed in claim 19 wherein the satellite units include handle means arranged generally at the top thereof to facilitate lifting the satellite units for transport thereof to remote serving stations.

35. A satellite coffee brewing system as claimed in claim 19 wherein a receiving funnel means associates with said inlet of the cover means for receipt therethrough of brewed coffee from said brew chamber.

36. A satellite coffee brewing system as claimed in claim 35 wherein the height of said satellite units is sufficient to place said funnel in close association of less than about one inch (2.54 cm.) below the discharge orifice of said brew chamber whereby hot brewed coffee is immediately directed through the funnel into the reservoir.

37. A satellite coffee brewing system as claimed in claim 1 wherein said central brewing unit includes a brew cycle switch in electrical association with a quality control timer circuit means and signal light means for each said discharge position, wherein upon the activation of the brew cycle switch a brew cycle initiates and results in the inletting of cold water to the water tank means and the resultant siphoning of hot water to the brew chamber and wherein said quality control timer circuit means is electrically activated at the initiation of said brew cycle to illuminate said signal light means for a pre-set period of time whereby while the signal light means is illuminated the operator can determine that the batch of brewed coffee is of an age less than the pre-set period.

38. A satellite coffee brewing system as claimed in claim 37 wherein the housing of the central brewing unit includes a control panel, said brew cycle switches and signal light means residing at said control panel, wherein the brew cycle switches and signal light means are arranged in separated sets, each set corresponding to the respective discharge position of the brew chamber whereby the operator is able to monitor the age of a batch of coffee for the particular satellite unit filled at each said discharge position.

39. A satellite coffee brewing system as claimed in claim 37 wherein during said pre-set period said signal light means is continuously illuminated.

40. A satellite coffee brewing system as claimed in claim 39 wherein said quality control timer circuit means includes means for flashing said signal light means for an interval of time following said pre-set period of continuous illumination, said flashing interval being substantially less than said continuous illumination period.

41. A satellite coffee brewing system as claimed in claim 37 wherein said central brewing unit further includes cancel switch means electrically associating with said quality control timer circuit means wherein said timer circuit means may be deactivated to thereby discontinue the illumination of said signal light means at any moment during said preset period.

42. A satellite coffee brewing system as claimed in claim 1 wherein said inlet valve means comprises a solenoid valve and an adjustable timer means electrically communicating with said solenoid valve, said timer means adapted to electrically energize said solenoid valve to open and admit water to the water tank for a pre-set length of time following the initiation of a brew cycle, said timer means further having a rotatable adjustment stem means for varying the length of time whereby the amount of inlet water and thereby the amount of displaced hot water siphoned to the brew chamber can be varied, the housing of the central brewing unit having a covered aperture, said timer means being arranged interiorly of the housing of the central brewing unit adjacent the covered aperture, said cover being removable to permit access to the timer means, said timer means further including a calibrated dial mounted around the rotatable adjustment stem means and indicator means mounted to the stem calibrated means, said dial and indicator means providing for the precise incremental rotation of said stem means by hand without the use of tools whereby the length of time that the solenoid valve is energized may be precisely set.

43. A satellite coffee brewing system as claimed in claim 42 wherein the indicator means comprises a turning knob and pointer adapted for the manual rotation thereof, wherein said calibrated dial is arranged to be viewable through said aperture upon the removal of said cover and the turning knob is manually accessible from the outside of the central brewing unit.

44. A satellite coffee brewing system as claimed in claim 42 wherein the calibrated dial is visually marked at four-second intervals and the length of time may be precisely set to vary the amount of inlet water within less than two fluid ounces (59.1 ml.) of the desired amount.

45. A satellite coffee brewing system comprising:
   a central brewing unit including
      a tank for holding water,
      means for heating the water,
      inlet valve means adapted to introduce water into the tank when a brewing cycle is required,
      siphon means for conveying hot water from the tank during a brewing cycle to a spray head assembly,
      a spray head assembly for receiving said siphoned water and directing said water therefrom,
      a brew chamber removably arranged below said spray head assembly for receipt of hot water therefrom and adapted to hold a load of coffee grounds therein for the brewing thereof, said brew chamber including a bottom drain orifice for the discharge of a stream of brewed coffee, said brew chamber being adjustable whereby to direct the discharge stream from said drain orifice in at least two separate discharge positions,
      a by-pass means for directing a portion of the hot siphoned water into the brew chamber separate from the hot water discharging from said spray head assembly;
   at least two satellite receptacle units for the receipt and storage of brewed coffee discharged from said brew chamber, the satellite units having a housing, an adjustable cover, and an insulated interior reservoir, said cover capable of being arranged on said housing to sealingly contain coffee in the reservoir and including inlet means for the receipt and passage therethrough of a stream of coffee, said cover being adjustable to align said inlet means below said bottom drain orifice of the brew chamber upon the positioning of said satellite unit at any said discharge position, the satellite unit further having a dispensing spigot means in fluid communication with the reservoir for the serving of coffee, said satellite units being free-standing and independent of said central brewing unit whereby to be transportable therefrom following the receipt therein of a batch of coffee and further capable of providing for the service of coffee either while at the brewing unit or remote from said brewing unit.

46. A satellite coffee brewing system as claimed in claim 45 wherein the housing for the brewing unit is compact for efficient use of space and has a width of less than about sixteen inches (40.6 cm.), said satellite units having a width no greater than about one-half of the width of the central brewing unit housing, and wherein said hot water tank is of a size capable of holding up to about four gallons (15.14 liters) of water and the satellite units having a reservoir of a size capable of holding up to about two gallons (7.57 liters) of brewed coffee, said brew chamber being adjustable into two discharge positions and wherein two satellite units may be arranged for filling at said discharge positions whereby the overall width of the system is no greater than about sixteen inches (40.6 cm.).

47. A coffee brewing system for use in commercial establishments which provides for the repetitive brewing of large batches of coffee of up to about two gallons (7.57 liters) per brew cycle and which includes a heating arrangement for quickly reheating hot water to the brewing temperature of from about 195° F. (90.6° C.) to about 208° F. (97.8° C.) in less than about ten minutes after the start of a preceding brew cycle, said system comprising a central brewing unit and at least two satellite receptacle units, the brewing unit having a single hot water tank and spray head assembly fluidly communicating by means of a siphon tube means, said hot water heated by a thermostatically controlled heating element therein, the heating element having greater than 4800 watt capacity, said brewing unit further including a single brew chamber for holding coffee grounds and receiving hot water from the spray head assembly, the brew chamber being movable into at least two discharge positions whereby a stream of brewed coffee may be directed downwardly at any of at least two locations so that a satellite unit may be filled at any said discharge position, the satellite units having an insulated coffee reservoir covered by a removable insulated cover means, said cover means including an inlet therethrough for the receipt of coffee into the reservoir and the cover means further being adjustable to dispose said inlet into a receiving alignment for any said discharge position of the brew chamber.

48. A satellite coffee brewing system comprising, in combination, a central brewing unit and a plurality of interchangeable satellite receptacle units capable of receiving, storing and dispensing brewed coffee discharged from the central brewing unit,
   said central brewing unit having:
      a hot water tank for storing water,
      a heating element inside the tank for heating water stored therein,
      the tank associating with a cold water inlet system for the controlled periodic admission of cold water generally at the bottom of the water tank,
      a sipon tube means for the conveyance of hot water displaced from the tank by the admission of cold water from the inlet system,
      a spray head assembly in fluid communication with the siphon tube means,
      a removable and adjustable brew chamber arranged below said spray head assembly wherein coffee grounds may be loaded for the brewing thereof by the hot water emitting from said spray head assembly, said brew chamber being adjustable to discharge a stream of coffee in any of at least two separate vertical paths;
   said satellite receptacle units having:
      a housing,
      an insulated reservoir interiorly of the housing,
      a cover means arrangeable over said reservoir, said cover means having an inlet therethrough opening to said reservoir, the cover means being adjustable to position the inlet in at least two separate positions over said reservoir, said satellite units each capable of being placed below said brew chamber for the receipt of coffee therefrom in any of said brew chamber discharge paths wherein said cover is adjustable to align said inlet with the vertical stream discharged from the brew chamber at any of said discharge positions, the satellite units further including spigot means for dispensing coffee from the reservoir into a coffee cup or the like, the satellite units being free-standing and independent of the central brewing unit whereby to be transportable for the dispensing of coffee at remote locations.

49. A satellite coffee brewing system as claimed in claim 48 wherein the siphon tube means includes a by-pass valve arranged therealong whereby a portion of the hot siphoned water is discharged therethrough to the brew chamber separately from the spray head assembly, the brew chamber having a side wall and bottom wall formed to receive and retain a filter paper for holding coffee grounds, the brew chamber including means for spacing the filter paper inwardly of the brew chamber away from said side wall and bottom wall, said by-pass valve being aligned to discharge the by-pass water between the filter paper and the side wall so that the by-pass water will circulate around the filter paper rather than through the coffee grounds.

50. A coffee brewing system including a brewing unit having a housing, a water tank means within said housing being associated with heating means for the water, a cold water inlet valve means for admission of water to the tank, a siphon tube means for discharge of hot water displaced from the water tank means by the admission of inlet water, a spray head assembly arranged with said housing whereby to receive the water from said siphon means and discharge the water therefrom, an adjustable brew chamber capable of being selectively positioned into at least two discharge positions, means for removably mounting the brew chamber below and in fluid communication with said spray head assembly, said brew chamber capable of holding a filter paper with coffee grounds therein and includes a side wall, a bottom wall and a drain orifice through the bottom wall, said brew chamber capable of filling a receptacle means placed therebelow in any of at least two positions for the receipt of coffee from said brew chamber at any of said discharge positions, the coffee brewing system further having a by-pass system for the direction of a portion of the hot siphoned water to flow around the filter paper rather than through the coffee grounds whereby to avoid overextraction of the coffee, said by-pass system including a by-pass valve arranged along said siphon tube means upstream of the spray head assembly so to discharge water separately from the spray head assembly, means provided at said brew chamber for directing the by-pass water away from the coffee grounds and comprising a plurality of vertically separated steps extending around the side wall, at least two spacer means arranged at said side wall generally near the top of the brew chamber and a basket means insertable into said brew chamber for holding a filter paper therein to be spaced inwardly from said side wall and said steps, whereby said spacer means is aligned below said by-pass valve so that the by-pass water is directed downwardly between the spaced-inward filter paper and side wall to ultimately drain from the brew chamber without flowing through the coffee grounds.

51. A coffee brewing system including a brewing unit having a housing, a water tank means within said housing being associated with heating means for the water, a cold water inlet valve means for admission of water to the tank, a siphon tube means for discharge of hot water displaced from the water tank means by the admission of inlet water, a spray head assembly arranged with said housing whereby to receive the water from said siphon means and discharge the water therefrom, an adjustable brew chamber capable of being selectively positioned into at least two discharge positions, means for removably mounting the brew chamber below and in fluid communication with said spray head assembly, said brew chamber capable of holding a filter paper with coffee grounds therein and includes a side wall, a bottom wall and a drain orifice through the bottom wall, said brew chamber capable of filling a receptacle means placed therebelow in any of at least two positions for the receipt of coffee from said brew chamber at any of said discharge positions, and wherein the heating means comprises a high capacity heating element of greater than 4800 watts, said heating element controlled by a running thermostat which includes means for sensing the water temperature in the tank and operates to open and close an electrical circuit whereby the heating element is alternately energized and de-energized, respectively, in order for the water in the tank to be maintained at a predetermined brewing temperature set at the running thermostat, a safety relay means wired separately to said heating element and said running thrmostat, whereby a higher voltage current is passed through said heating element and a lower voltage current is passed through said running thermostat, wherein the relay means opens and closes the higher voltage circuit for said heating element responsive to the opening and closing of the lower voltage current circuit caused by said running thermostat, whereby the running thermostat is operated at said lower voltage current.

52. A coffee brewing system including a brewing unit having a housing, a water tank means within said housing being associated with heating means for the water, a cold water inlet valve means for admission of water to the tank, a siphon tube means for discharge of hot water displaced from the water tank means by the admission of inlet water, a spray head assembly arranged with said housing whereby to receive the water from said siphon means and discharge the water therefrom, an adjustable brew chamber capable of being selectively positioned into at least two discharge positions, means for removably mounting the brew chamber below and in fluid communication with said spray head assembly, said brew chamber capable of holding a filter paper with coffee grounds therein and includes a side wall, a bottom wall and a drain orifice through the bottom wall, said brew chamber capable of filling a receptacle means placed therebelow in any of at least two positions for the receipt of coffee from said brew chamber at any of said discharge positions, further including a plurality of free-standing satellite receptacle units capable of receiving coffee from any said discharging position of the brew chamber, said satellite receptacle units comprising an outer housing defining a generally open top, a coffee reservoir arranged interiorly of said housing and opening upwardly to communicate with the outside of the unit through said open top, the reservoir and housing defining a void space therebetween, a removable and adjustable cover means for covering said reservoir, said cover means including an inlet therethrough for passage of coffee into said reservoir, said cover means being adjustable into at least two different coffee-receiving orientations atop said reservoir whereby to dispose said inlet at said different orientations, said satellite receptacle unit further including a drain means generally at the bottom of said reservoir and extending outwardly of said housing to terminate in a manually operable spigot means, a sight gauge means fluidly communicating with said drain means and arranged in a vertical orientation outwardly of said housing whereby the level of coffee in said reservoir may be monitored from the exterior of said satellite unit, said sight guage means further including a restrictor valve means generally at the bottom thereof whereby upon the opening of the spigot means to dispense coffee, coffee inside the sight gauge means is impeded from flowing therefrom and the coffee dispensed from the spigot means is substantially at the same temperature as the interior of said reservoir, said adjustable cover means adapted to dispose said inlet into any of said discharge positions of the brew chamber whereby a satellite unit may be arranged at any one of said discharge positions, whereby the plurality of satellite receptacle units may be interchangeably used with said brewing unit for receipt of coffee at any selected position, said satellite units further being capable of dispensing coffee while arranged at said brewing unit or may be transported for the serving of coffee at remote locations therefrom.

53. A coffee brewing system including a brewing unit having a housing, a water tank means within said housing being associated with heating means for the water, a cold water inlet valve means for admission of water to the tank, a siphon tube means for discharge of hot water displaced from the water tank means by the admission of inlet water, a spray head assembly arranged with said housing whereby to receive the water from said siphon means and discharge the water therefrom, an adjustable brew chamber capable of being selectively positioned into at least two discharge positions, means for removably mounting the brew chamber below and in fluid communication with said spray head assembly, said brew chamber capable of holding a filter paper with coffee grounds therein and includes a side wall, a bottom wall and a drain orifice through the bottom wall, said brew chamber capable of filling a receptacle means placed therebelow in any of at least two positions for the receipt of coffee from said brew chamber at any of said discharge positions, further including the combination of a brew cycle switch, a quality control timer circuit means and a signal light means, wherein upon the activation of the brew cycle switch a brew cycle initiates resulting in the inletting of cold water to the water tank means and siphoning of hot water to the brew chamber and wherein said quality control timer circuit means is electrically activated at the beginning of said brew cycle to illuminate said signal light means for a pre-set period of time whereby the operator can determine that the resultant brew of coffee is of an age less than the pre-set period by observing that the signal light means is illuminated.

54. A coffee brewing system including a brewing unit having a housing, a water tank means within said housing being associated with heating means for the water, a cold water inlet valve means for admission of water to the tank, a siphon tube means for discharge of hot water displaced from the water tank by the admission of inlet water, a spray head assembly arranged with said housing whereby to receive the water from said siphon means and discharge the water therefrom, an adjustable brew chamber capable of being selectively positioned into at least two discharge positions, means for removably mounting the brew chamber below and in fluid communication with said spray head assembly, said brew chamber capable of holding a filter paper with coffee grounds therein and includes a side wall, a bottom wall and a drain orifice through the bottom wall, said brew chamber capable of filling a receptacle means placed therebelow in any of at least two positions for the receipt of coffee from said brew chamber at any of said discharge positions, and wherein said brewing unit further includes means for precisely controlling the amount of water introduced by said inlet valve means and wherein said inlet valve means comprises a solenoid valve and a timer means electrically communicating with said solenoid valve, said timer means adapted to electrically energize said solenoid valve to open and admit water to the water tank means for a pre-set length of time following the initiation of a brew cycle, said timer means being adjustable and further having a rotatable adjustment stem means for varying the length of time so that the amount of inlet water and thereby the amount of displaced hot water siphoned to the brew chamber can be varied, said timer means being arranged interiorly of the housing adjacent a covered aperture therethrough permitting access to the timer means, said timer means further including a calibrated dial mounted around said rotatable adjustment stem means and an indicator means mounted to said stem means for rotation thereof, said dial being visually marked in units of time to facilitate the precise incremental rotation of said indicator means to a time setting marked on said dial, a setting capable of being made by hand without the use of tools whereby the length of time that the solenoid valve is energized may be precisely adjusted.

55. A coffee brewing system including a brewing unit having a housing, a water tank means within said housing being associated with heating means for the water, a cold water inlet valve means for admission of water to the tank, a siphon tube means for discharge of hot water displaced from the water tank means by the admission of inlet water, a spray head assembly arranged with said housing whereby to receive the water from said siphon means and discharge the water therefrom, an adjustable brew chamber capable of being selectively positioned into at least two discharge positions, means for removably mounting the brew chamber below and in fluid communication with said spray head assembly, said brew chamber capable of holding a filter paper with coffee grounds therein and includes a side wall, a bottom wall and a drain orifice through the bottom wall, said brew chamber capable of filling a receptacle means placed therebelow in any of at least two positions for the receipt of coffee from said brew chamber at any of said discharge positions, and wherein said brewing unit further includes a hot water system and faucet assembly capable of discharging hot water separately from said siphon tube means, said faucet assembly arranged to extend outwardly of said housing whereby to facilitate dispensing clear hot water therefrom into a cup, or the like, said faucet assembly being connected to an extender means fluidly communicating therewith and extending therebelow for a preselected distance whereby the discharge of clear hot water to a cup or the like is made at said preselected distance from said faucet assembly.

56. A coffee brewing system as claimed in claim 55 wherein the faucet assembly includes an outlet tube and wherein said extender means comprises a flexible tube sized to fit around said outlet tube, said flexible tube including a rigid insert tube therein spaced downwardly from said outlet tube whereby the flexible tube is capable of bending at a hinge portion therebetween, said rigid insert tube extending downwardly for substantially the full length of said flexible tube, and a stream staightener means associating at the bottom of said rigid insert tube, whereby said flexible tube insulates said rigid insert upon the discharging of hot water through said faucet assembly.

57. A coffee brewing system as claimed in claims 50, 51, 52, 53, 54 or 55, further having said adjustable brew chamber cooperative with safety switch means, the adjustable brew chamber being rotatably mounted with said mounting means and thereby capable of adjustment to position said discharge orifice into said discharge positions whereby a stream of brewed coffee discharged therefrom may take selected separate vertical paths, said safety switch means being arranged at said housing to be closable by the brew chamber upon the disposition of the brew chamber at any one of said discharge positions, said safety switch means including a plurality of electrical switches each switch being arranged with said central brewing unit in correspondence with the position of said brew chamber at each said discharge position and positioned to be contacted and closed by said brew chamber upon the adjustment thereto to the corresponding discharge position, said switches being closable to facilitate the completion of an electrical circuit wherein a brewing cycle for any one of said brewing discharge positions may be initiated only when the respective switch is closed by the brew chamber.

58. In a brewing device having a hot water tank and means associated therewith for heating water in the tank, and a hot water system associating with said hot water tank and a faucet assembly means fluidly communicating with said hot water system and adapted to discharge clear hot water therefrom, the improvement comprising an outlet tube affixed to said faucet assembly whereby hot water is discharged therethrough, a flexible extender means arranged with said outlet tube and having a length whereby the discharge of hot water is made at a preselected distance below said outlet tube, said flexible extender tube means comprising a flexible tube sized to fit around said outlet tube and including therein a rigid insert tube spaced downwardly from said outlet tube whereby said flexible tube is capable of hingeably bending therebetween, said rigid insert tube further including a stream straightener at a bottom open end thereof, said rigid insert tube extending for substantially the full length of said flexible tube whereby said flexible tube is maintained in a stable, vertical alignment during the discharge of hot water and wherein said flexible tube insulates the rigid insert as it is heated during the discharge of hot water whereby the operator is kept from contacting said rigid insert tube, said extender tube means capable of said hingeably bending upon experiencing contact thereto and adapted to return to said vertical orientation upon the termination said contact.

59. The improvement as in claim 58 wherein said flexible tube comprises silicone rubber.

* * * * *